United States Patent [19]
Ikezaki

[11] Patent Number: 5,200,742
[45] Date of Patent: Apr. 6, 1993

[54] ELECTRONIC DEVICE WITH EXCLUSIVE CONTROL TYPE COMMUNICATION FUNCTION AND ITS COMMUNICATION SYSTEM

[75] Inventor: Masao Ikezaki, Neyagawa, Japan

[73] Assignee: Matsushita Electric Industrial Co., Ltd., Osaka, Japan

[21] Appl. No.: 501,120

[22] Filed: Mar. 29, 1990

[30] Foreign Application Priority Data

Mar. 31, 1989 [JP] Japan ................... 1-083418

[51] Int. Cl.⁵ .............................................. H04Q 1/00
[52] U.S. Cl. ............................ 340/825.03; 340/825.06
[58] Field of Search ................ 340/825.03, 825.22, 340/825.24, 825.25, 825.06, 825.05, 825.53; 370/85.1, 85.15, 124, 110.1, 94.1; 455/4, 5, 6, 19, 352; 358/185, 181, 194.1, 85, 86; 379/101

[56] References Cited

U.S. PATENT DOCUMENTS

| | | | |
|---|---|---|---|
| 4,510,493 | 4/1985 | Bux et al. | 340/825.22 |
| 4,627,070 | 12/1986 | Champlin et al. | 340/825.05 |
| 4,722,082 | 1/1988 | Furuya et al. | 370/110.1 |
| 4,745,601 | 4/1988 | Diaz et al. | 370/110.1 |
| 4,804,938 | 2/1989 | Rouse et al. | 340/825.06 |
| 4,808,992 | 2/1989 | Beyers, Jr. et al. | 340/825.24 |
| 4,872,162 | 10/1989 | Tanaka et al. | 370/94.1 |
| 5,031,175 | 7/1991 | Tanaka et al. | 370/94.1 |

OTHER PUBLICATIONS

International Electrotechnical Commission: IEC 84 (Secretariat) 86 I II Draft–Domestic Digital Bus D²B, Jun. 8, 1988.

Primary Examiner—Donald J. Yusko
Assistant Examiner—Edwin C. Holloway, III
Attorney, Agent, or Firm—Stevens, Davis, Miller & Mosher

[57] ABSTRACT

In a communication system including a plurality of electronic communication devices connected to a common transmission line, each of the electronic communication devices includes a communication section and at least one control section, wherein the control section establishes a logical communication channel on the common transmission line to perform communication therethrough between a control section of an electronic communication device and one or more control sections of another electronic communication device, and wherein it is made possible for the control section to reject a request for establishing a separate logical communication channel issued thereto by any other control section which has no relation to the logical communication channel which has already been established. Thus, the communication system is constructed to enable efficient mutual communication to be performed between the control sections.

18 Claims, 28 Drawing Sheets

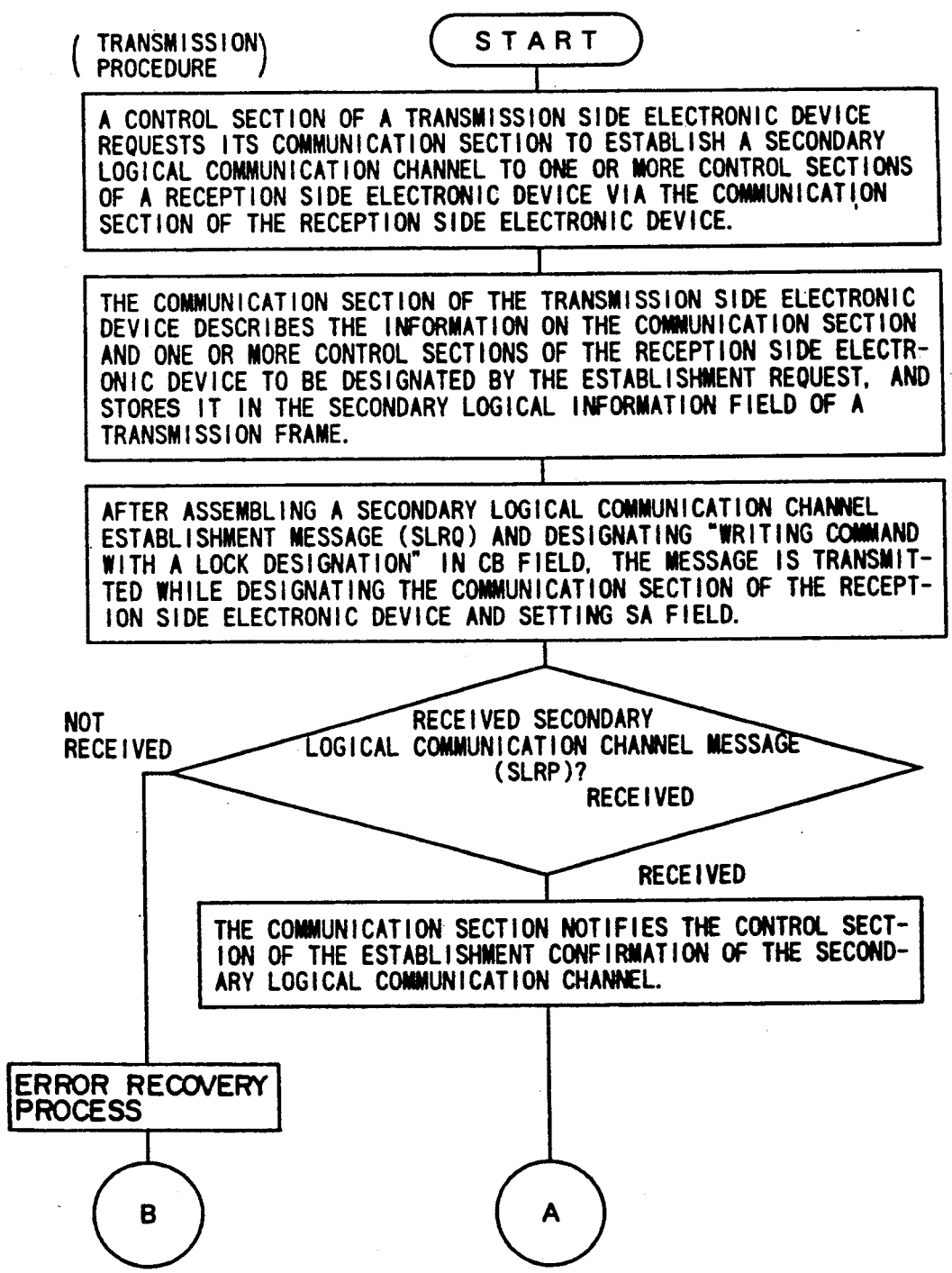

FIG. 5A (START)

(TRANSMISSION PROCEDURE)

UPON RECEPTION OF AN ESTABLISHMENT NOTICE BY A CONTROL SECTION, THE ESTABLISHMENT NOTICE IS ABORTED IF THE SECONDARY LOGICAL COMMUNICATION CHANNEL HAS ALREADY BEEN ESTABLISHED AT THE CONTROL SECTION, OR IF NOT AN ESTABLISHMENT RESPONSE IS RETURNED. THE INFORMATION ON ANOTHER CONTROL SECTION WHICH REQUESTED TO ESTABLISH THE SECONDARY LOGICAL COMMUNICATION CHANNEL DESIGNATED BY THE ESTABLISHMENT NOTICE IS TEMPORARILY STORED IN BOTH CASES, AND IN THE LATTER CASE THE SECONDARY LOGICAL COMMUNICATION CHANNEL IS ESTABLISHED.

THE INFORMATION ON THE CONTROL SECTION AND OTHER CONTROL SECTION DESIGNATED BY THE ESTABLISHMENT NOTICE IS DESCRIBED BY THE CONTROL SECTION AT THE SECONDARY LOGICAL INFORMATION FIELD TO ASSEMBLE A SECONDARY LOGICAL COMMUNICATION CHANNEL ESTABLISHMENT RESPONSE MESSAGE (SLRP) WHICH IS PASSED TO THE COMMUNICATION SECTION, AND AFTER DESIGNATING "WRITING COMMAND WITH A LOCK DESIGNATION" AT CB FIELD, THE MESSAGE IS TRANSMITTED TO THE OTHER COMMUNICATION SECTION.

THE CONTROL SECTION ENTERS IN A STATE CAPABLE OF RECEIVING A TRANSFER NOTICE OR RELEASE NOTICE FROM THE COMMUNICATION SECTION.

(A)

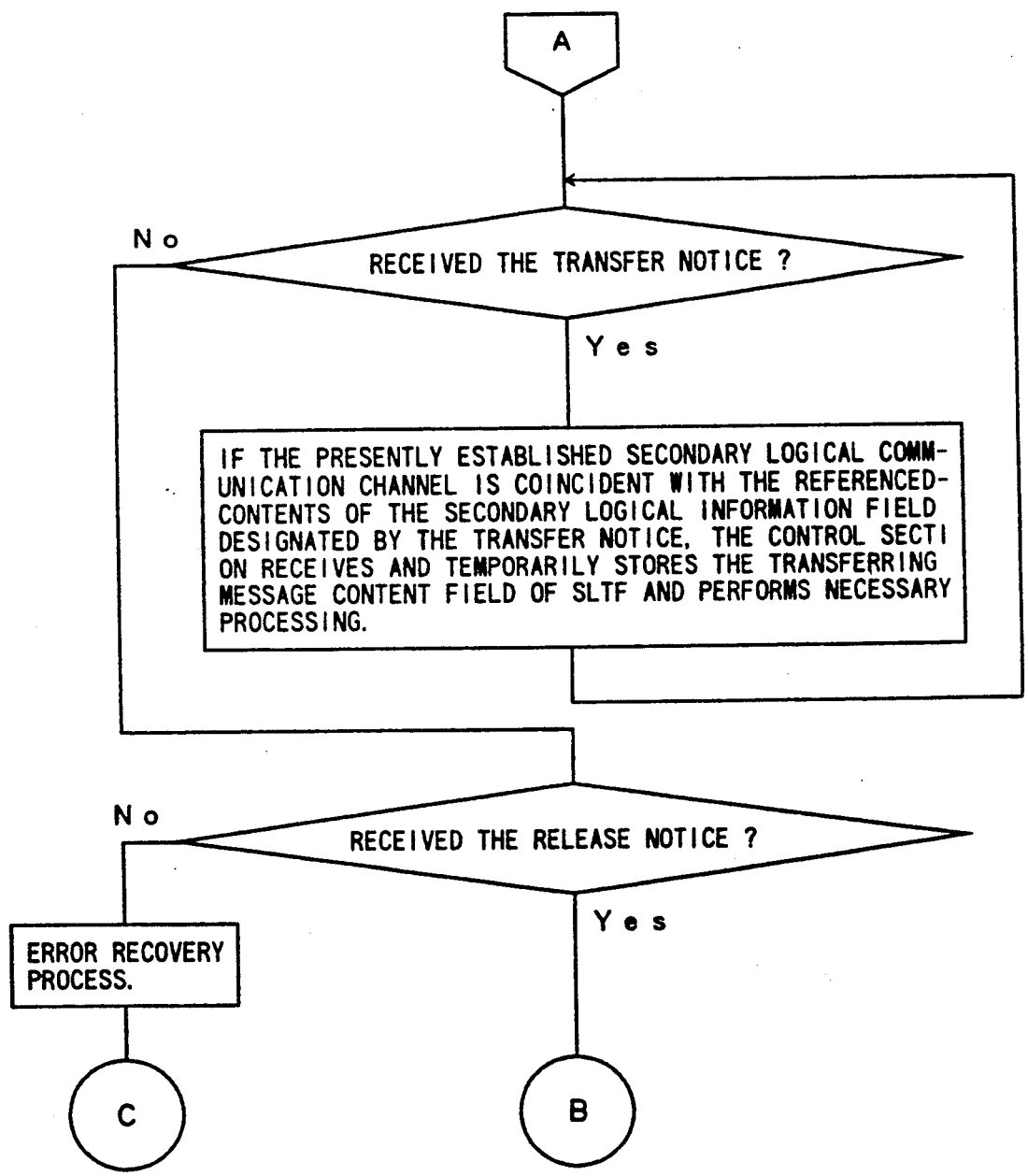

FIG. 5C

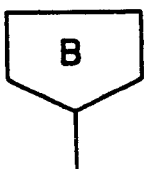

UPON RECEPTION OF THE RELEASE NOTICE BY THE CONTROL SECTION, IF THE PRESENTLY ESTABLISHED SECONDARY LOGICAL COMMUNICATION CHANNEL IS BEING DESIGNATED IN THE DESIGNATED SECONDARY LOGICAL INFORMATION FIELD, THE CONTROL SECTION CLEARS THE INFORMATION ON THE ESTABLISHED SECONDARY LOGICAL COMMUNICATION CHANNEL TEMPORARILY STORED THEREIN AND RELEASES THE SECONDARY LOGICAL COMMUNICATION CHANNEL.

THE CONTROL SECTION SENDS TO THE COMMUNICATION SECTION A RELEASE RESPONSE FOR NOTIFYING ANOTHER CONTROL SECTION OF THE TRANSMISSION SIDE ELECTRONIC DEVICE OF A NORMAL RECEPTION OF THE RELEASE NOTICE, WHILE DESIGNATING THE INFORMATION ON THE RELEASED SECONDARY LOGICAL COMMUNICATION CHANNEL.

THE COMMUNICATION SECTION ASSEMBLES A SECONDARY LOGICAL COMMUNICATION CHANNEL RELEASE RESPONSE MESSAGE (SLRP) AND SENDS IT BACK TO THE TRANSMISSION SIDE ELECTRONIC DEVICE, WHILE DESCRIBING THE INFORMATION ON THE RELEASED SECONDARY LOGICAL COMMUNICATION CHANNEL AT THE SECONDARY LOGICAL INFORMATION FIELD OF SLRP.

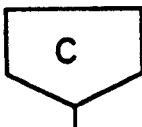

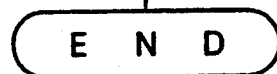

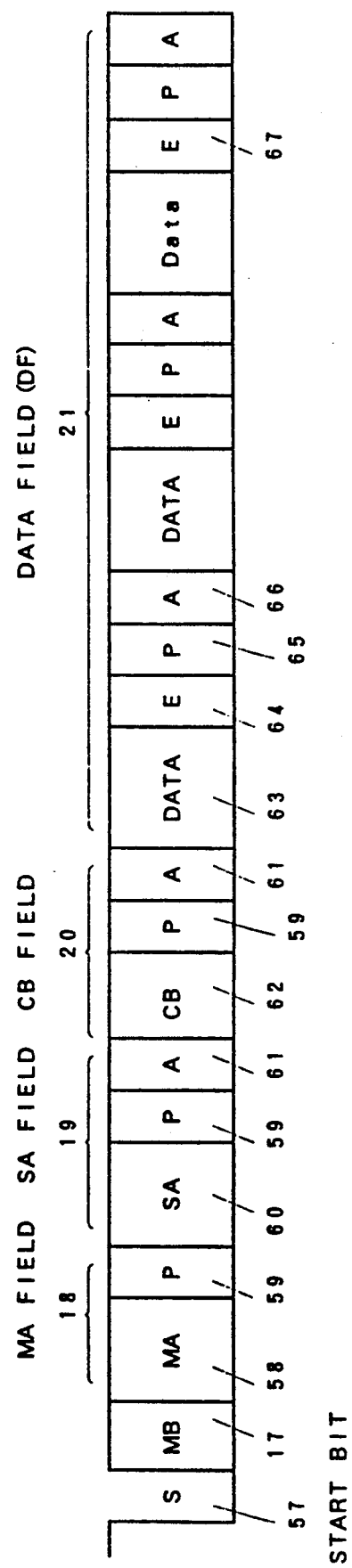

FIG. 8 PRIOR ART

| CB VALUE b3 b2 b1 b0 | MESSAGE DATA DIRECTION | OPERATION CONTENTS | LOCKING OPERATION | ABBREVIATED SYMBOL |
|---|---|---|---|---|
| 0 0 0 0 | READ | READ SLAVE STATUS | NO LOCK | RSS |
| 0 0 0 1 | READ | reserved | — | — |
| 0 0 1 0 | READ | READ SLAVE STATUS | LOCK | RSS+ℓ |
| 0 0 1 1 | READ | READ DATA | LOCK | RD+ℓ |
| 0 1 0 0 | READ | READ LOCK ADDRESS (M L) | NO LOCK | — |
| 0 1 0 1 | READ | READ LOCK ADDRESS (H) | NO LOCK | — |
| 0 1 1 0 | READ | READ SLAVE STATUS | LOCK RELEASE | RSS+uℓ |
| 0 1 1 1 | READ | READ DATA | LOCK RELEASE | RD+uℓ |
| 1 0 0 0 | WRITE | WRITE MEMORY ADDRESS | LOCK | — |
| 1 0 0 1 | WRITE | reserved | — | — |
| 1 0 1 0 | WRITE | WRITE COMMAND | LOCK | WC+ℓ |
| 1 0 1 1 | WRITE | WRITE DATA | LOCK | WD+ℓ |
| 1 1 0 0 | WRITE | reserved | — | — |
| 1 1 0 1 | WRITE | reserved | — | — |
| 1 1 1 0 | WRITE | WRITE COMMAND | LOCK RELEASE | WC+uℓ |
| 1 1 1 1 | WRITE | WRITE DATA | LOCK RELEASE | WD+uℓ |

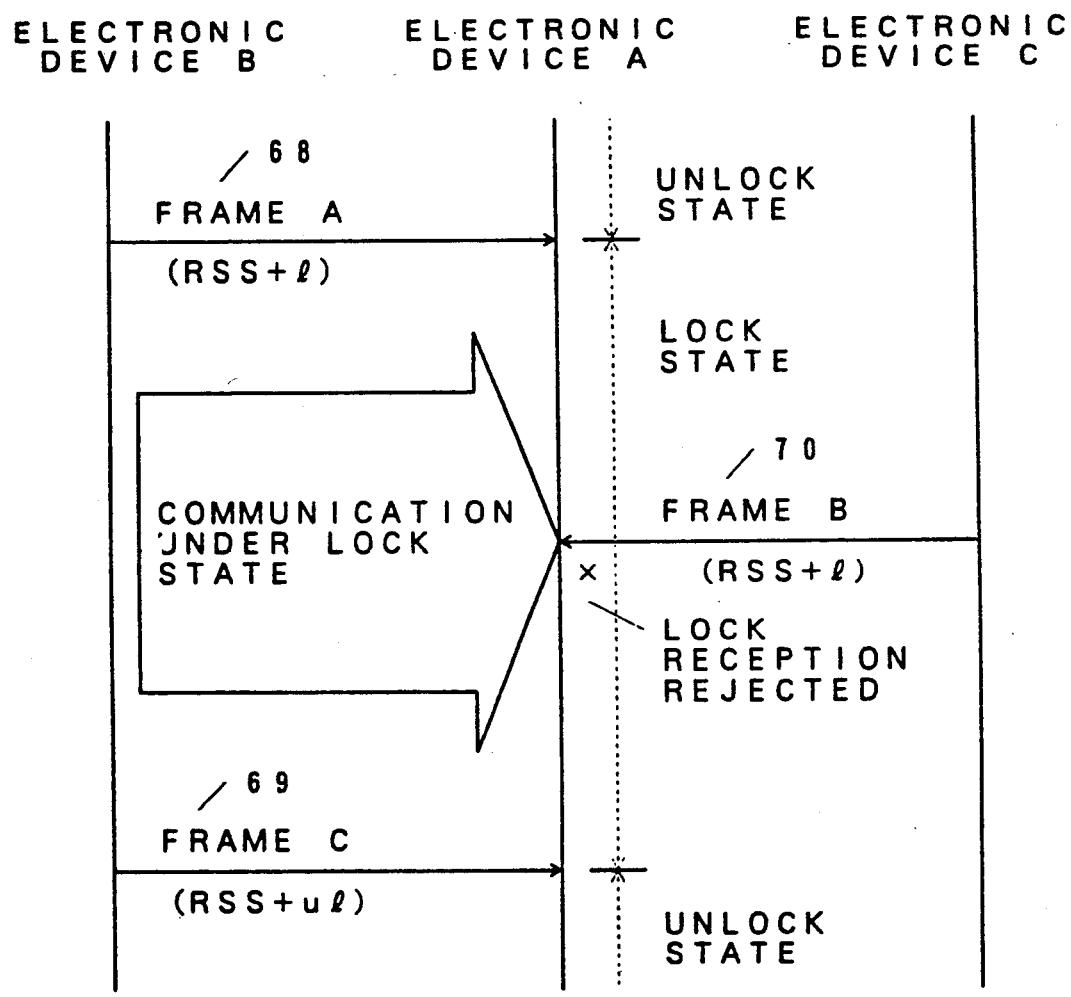

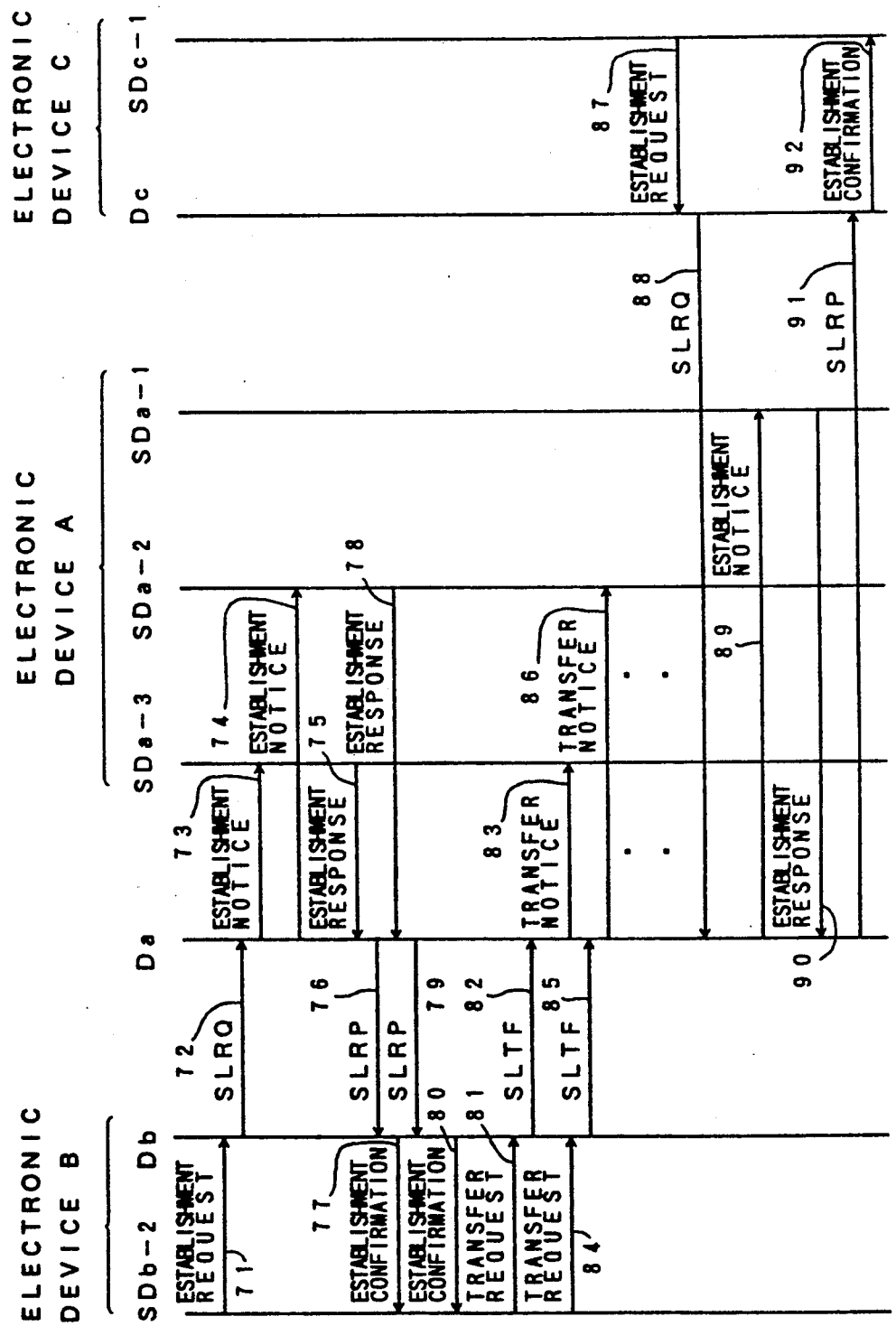

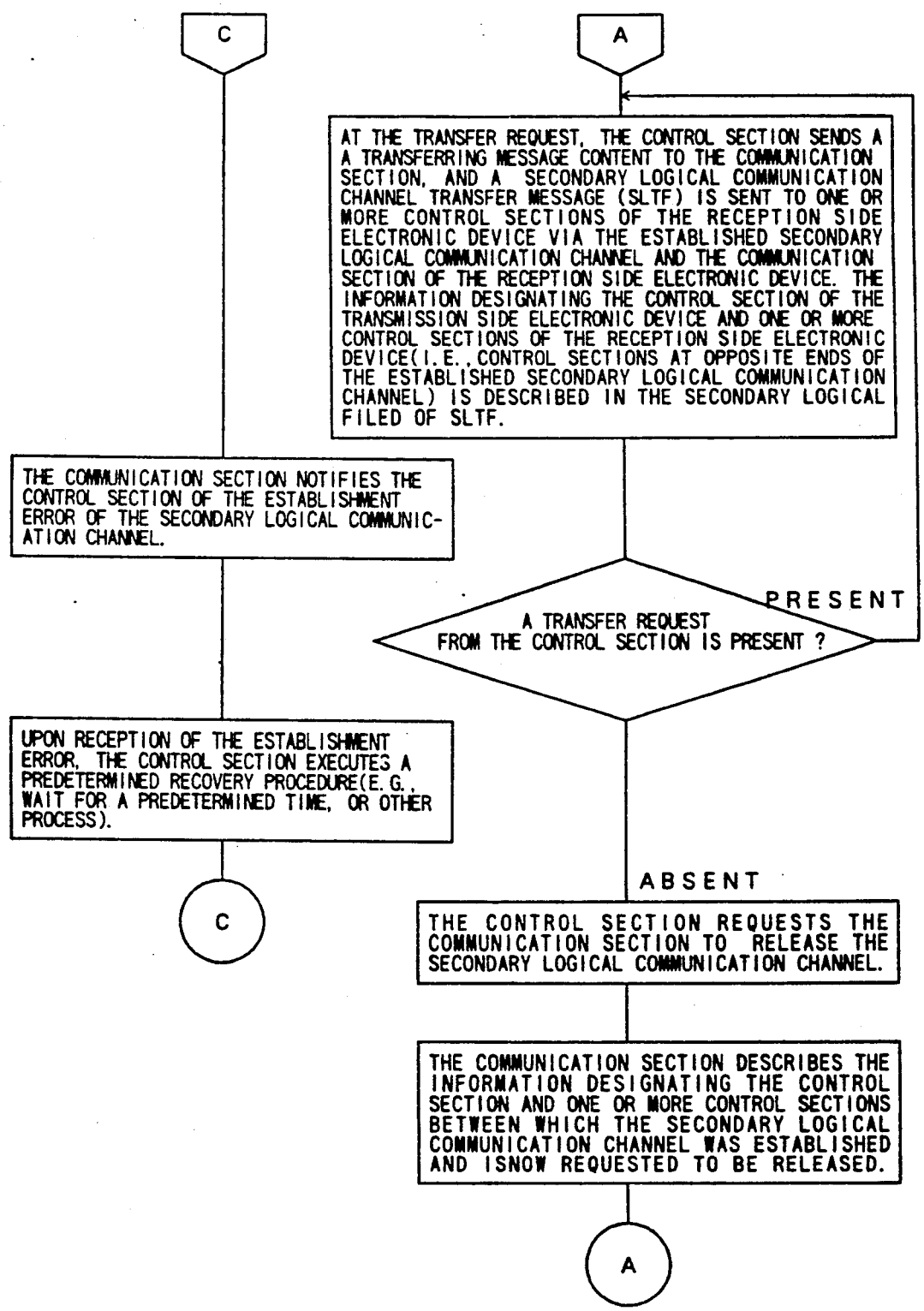

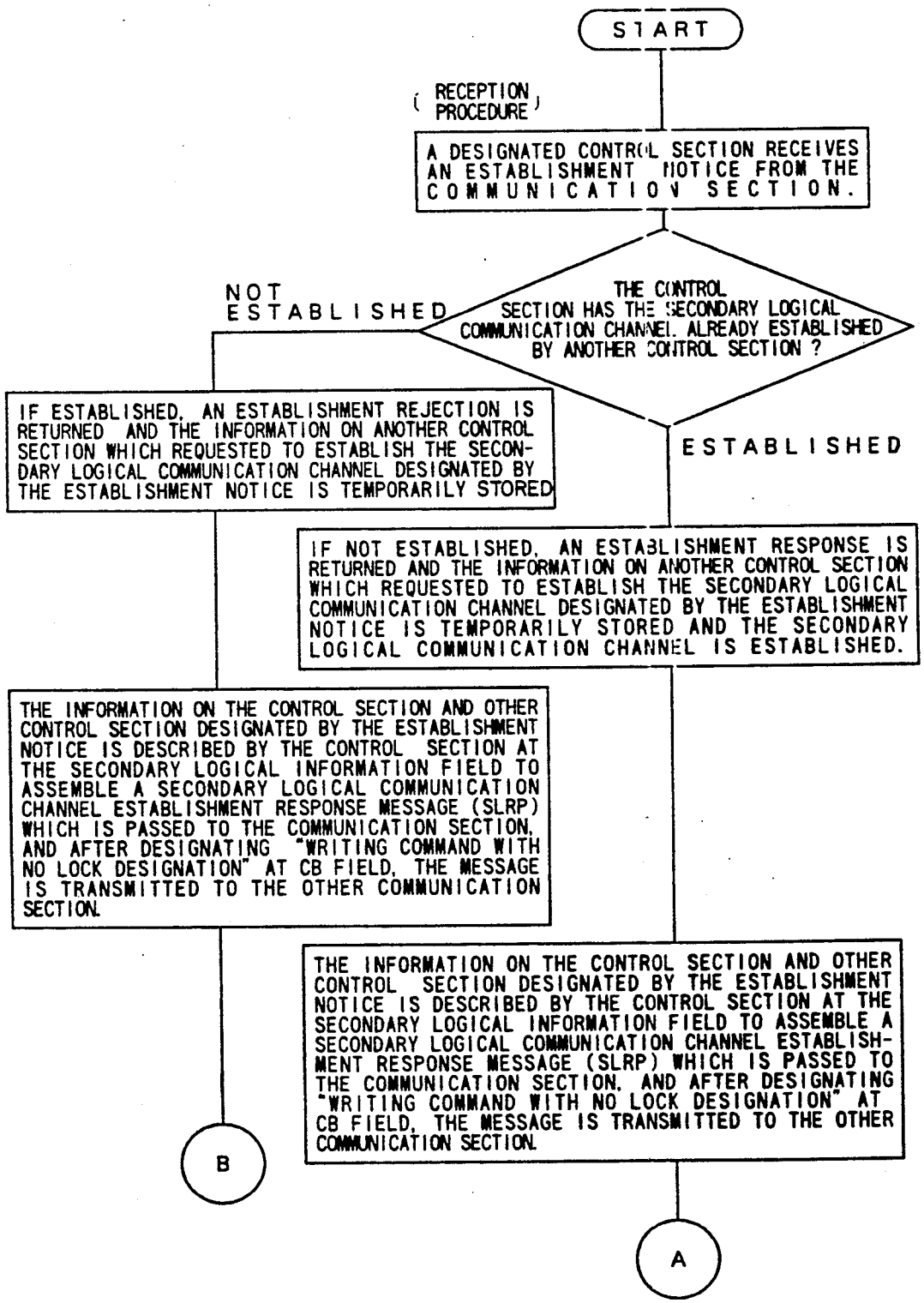

FIG. 16

| CB VALUE b3 b2 b1 b0 | MESSAGE DATA DIRECTION | OPERATION CONTENTS | LOCKING OPERATION | ABBREVIATED SYMBOL |
|---|---|---|---|---|
| 0 0 0 0 | READ | READ SLAVE STATUS | NO LOCK | RSS |
| 0 0 0 1 | READ | reserved | — | — |
| 0 0 1 0 | READ | READ SLAVE STATUS | LOCK | RSS+$\ell$ |
| 0 0 1 1 | READ | READ DATA | LOCK | RD+$\ell$ |
| 0 1 0 0 | READ | READ LOCK ADDRESS (M L) | NO LOCK | — |
| 0 1 0 1 | READ | READ LOCK ADDRESS (H) | NO LOCK | — |
| 0 1 1 0 | READ | READ SLAVE STATUS | LOCK RELEASE | RSS+u$\ell$ |
| 0 1 1 1 | READ | READ DATA | LOCK RELEASE | RD+u$\ell$ |
| 1 0 0 0 | WRITE | WRITE MEMORY ADDRESS | LOCK | — |
| 1 0 0 1 | WRITE | reserved | — | — |
| 1 0 1 0 | WRITE | WRITE COMMAND | LOCK | WC+$\ell$ |
| 1 0 1 1 | WRITE | WRITE DATA | LOCK | WD+$\ell$ |
| 1 1 0 0 | WRITE | reserved | NO LOCK | WC |
| 1 1 0 1 | WRITE | reserved | NO LOCK | WD |
| 1 1 1 0 | WRITE | WRITE COMMAND | LOCK RELEASE | WC+u$\ell$ |
| 1 1 1 1 | WRITE | WRITE DATA | LOCK RELEASE | WD+u$\ell$ |

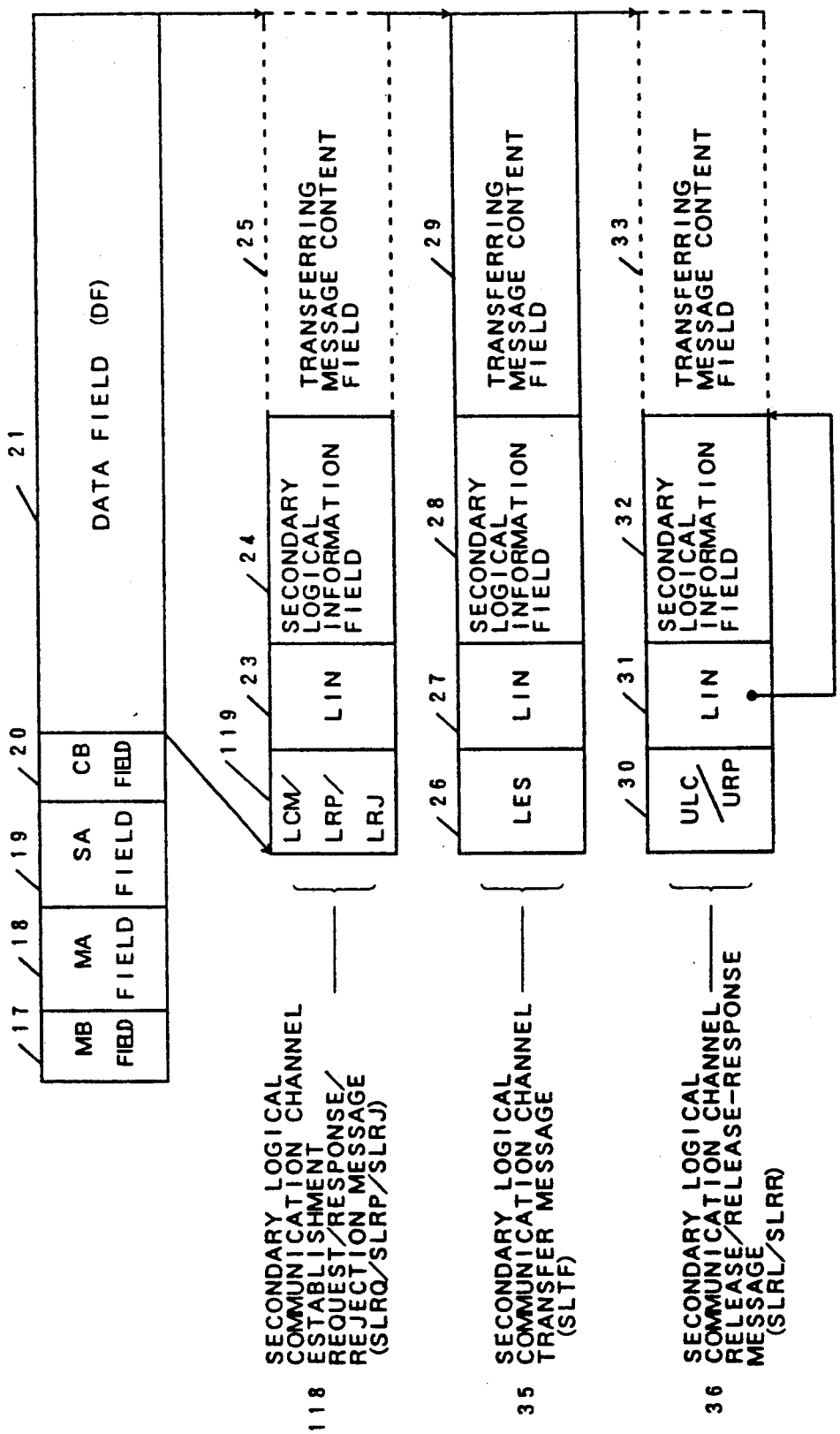

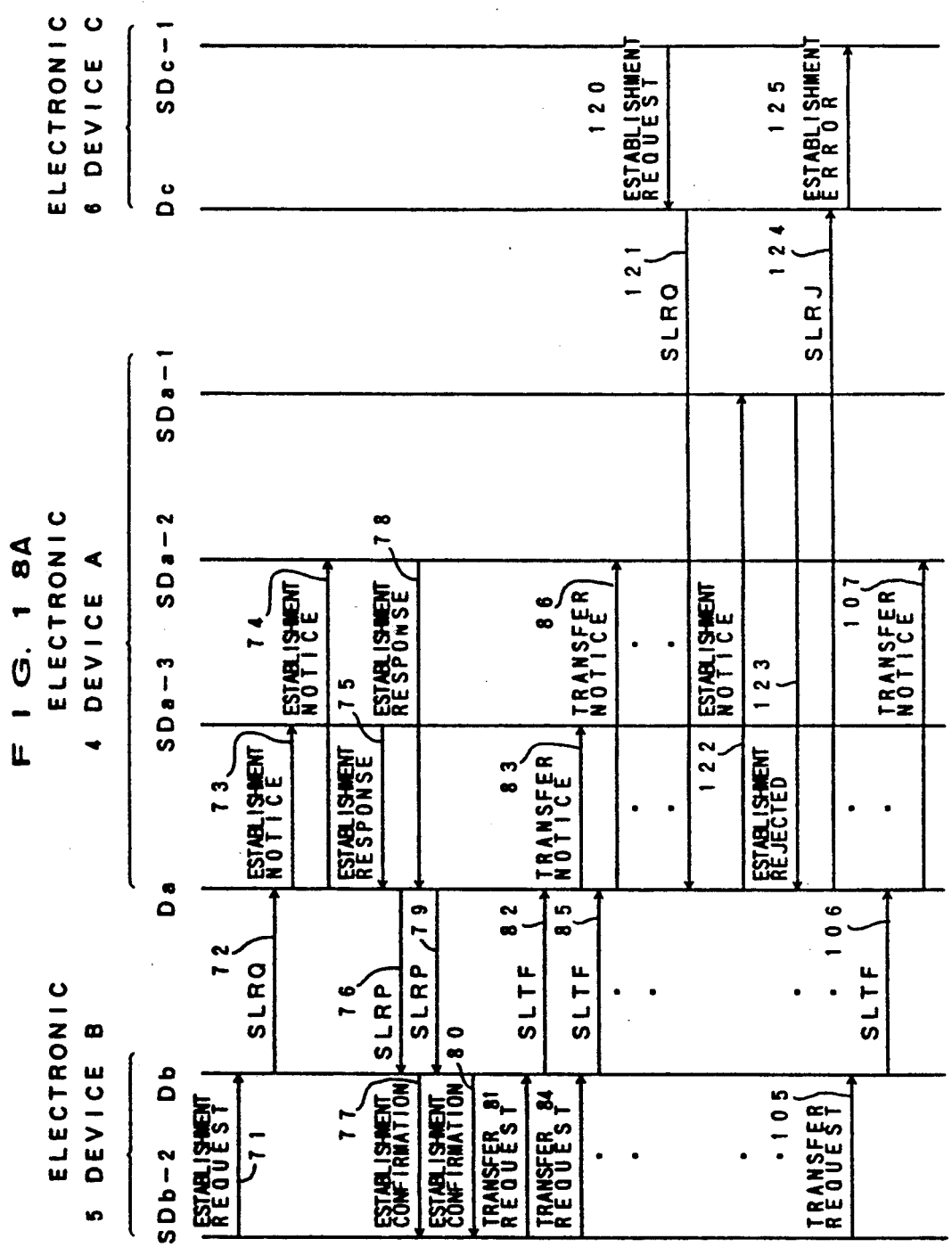

ELECTRONIC DEVICE WITH EXCLUSIVE CONTROL TYPE COMMUNICATION FUNCTION AND ITS COMMUNICATION SYSTEM

BACKGROUND OF THE INVENTION

The present invention relates to an electronic device having a communication function to be used as audio video apparatus and home use information apparatus connected to a common signal transmission line wherein operation control signals are transmitted/ received as a message.

Conventionally, as a mutual communication between audio video apparatus connected to a common signal transmission line, there is known a Domestic Digital Bus (D²B) (IEC 84 (Secretariat) 86 I, II: Draft-Domestic Digital Bus (D²B)). There is well known a system construction wherein audio video apparatus having a built-in communication section with a communication function are connected onto the bus as shown in FIG. 6.

When the control section (SDb-1) 13 of an electronic device B 5 shown in FIG. 6 communicates with the control section (SDa-3) 12 of an electronic device A 4, a message as shown in FIG. 7 and a communication procedure as shown in FIG. 9 have been used conventionally. In FIG. 7, a symbol S 57 represents a start bit MB 17 a mode bit, MA 58 a master address, SA 60 a slave address, CB 62 a control bit, P 59 a parity bit, A 61 a acknowledging bit, E 64 a end-of-data bit and Data data bits. FIG. 11 shows the logical structure of a logical interconnection of communication between the electronic devices B 5 and A 4. When the control section (SDb-1) 13 of the electronic device B 5 shown in FIG. 11 sends to a communication section (Db) 8 a request for communicating with the control section (SDa-3) 12 of the electronic device A 4, the communication section 8 assembles a frame A 68 as shown in FIG. 9 in accordance with the format shown in FIG. 7, and sends the frame to the electronic device A 4 via a signal transmission line 1 shown in FIG. 11. In this case, a slave status read code with a lock designation (CB field) b3b2b1b0="0010" shown in FIG. 8 is set in CB 62 of a CB frame 20 shown in FIG. 7 of the frame A 68. Upon transmission of the frame A 68 shown in FIG. 9, the communication section 8 of the electronic device B 5 knows that the destination electronic device A 4 is not communicating with another electronic device and in an unlock state. Since the communication section 8 of the electronic device B 5 has designated a lock by the transmitted frame A 68, the electronic device A 4 is caused by the electronic device B 5 to enter a lock state where the logical communication channel is occupied by the devices A 4 and B 5, when the acknowledge normal response in an acknowledging bit field (A) 61 in the CB field 20 shown in FIG. 7 is received. The connection state in this logically occupied state is shown by a primary logical communication channel 2 shown in FIG. 11. When the communication section 8 of the electronic device B 5 receives the slave status shown in FIG. 10 and provided at the communication section 7 of the electronic device A 4, in the data filed (DF) of the frame A 68 shown in FIG. 9, the communication section 8 can know on the basis of the value of bit b3 in the slave status shown in FIG. 10 whether or not the electronic device A 4 has been already locked by another electronic device. Upon reception of the frame A 68 shown in FIG. 9, the primary logical communication channel 2 shown in FIG. 11 is established and the electronic device A 4 enters a lock state occupied by the electronic device B 5. After entering the lock state, the electronic devices B 5 and A 4 communicate with each other via the primary logical communication channel 2 shown in FIG. 11 under the lock state. Lastly, the electronic device B 5 sends to the electronic device A 4 the frame C 69 shown in FIG. 9 by setting in CB 20 shown in FIG. 7 a slave status read code (CB value) b3b2b1b0="0110" with an unlock designation. The occupied state of the electronic device A4 thereby changes from the lock state to the unlock state, and thereafter the lock designation by another electronic device is allowed. Further, under the condition that the electronic devices B 5 and A 4 are communicating with each other under the lock state shown in FIG. 9, if the electronic device A 4 receives from the electronic device C 6 a frame B 70 indicating a slave status read code with a lock designation, the electronic device A 4 responds to the frame B 70 by making the bit b2 of the slave status shown in FIG. 10 in the clock state, because the electronic device A 4 has been already occupied by the electronic device B 5 and is communicating therewith.

In a conventional electronic device with a communication function or in a conventional communication method, there is established only one primary logical communication channel for mutual communication between the communication sections of different electronic devices under the logically occupied state of the primary logical communication channel Therefore, in the situation where each electronic device has a plurality of control sections which are controlled via the primary logical communication channel, i.e., in the situation where a control section of an electronic device controls one or more control sections of another electronic device via the primary logical communication channel, a control section different from the control section of the first-mentioned electronic device is allowed at the same time to control via the primary logical communication channel the one or more control sections of the other electronic device. As a result, a plurality of different control sections of the first-mentioned electronic device operates at the same time the control section of the other electronic device operates, so that it is impossible to carry out an exclusive control between control sections.

Furthermore, the operation of the control section of the other electronic device under control by the control section of the first-mentioned electronic device cannot be ensured.

Still further, a control section of an electronic device cannot carry out a broadcast communication relative to a plurality of specified control sections of another electronic device The control section of the electronic device is allowed to transmit a message only to all, or a specified one of, the control sections of the other electronic device, without the provision of a function to transmit a message to a plurality of specified control sections.

Further, if a primary logical communication channel is established between one or more control sections of a first electronic device upon request from a control section of a second electronic device, a control section of a third electronic device is not allowed at the same time to communicate with a not-occupied control section excepting the one or more control sections of the first electronic device

SUMMARY OF THE INVENTION

It is an object of the present invention to provide a communication method and an electronic device or system having a communication function for performing the communication method capable of carrying out an exclusive control between control sections by providing a simple communication procedure and a logical communication channel defined by the communication procedure.

In order to achieve the above object, according to the first embodiment of this invention, exclusive control between control sections is realized by providing means for transferring a message in a communication section and in a control section of each electronic device connected to a common signal transmission line, providing in the control section means for establishing a secondary logical communication channel on a primary logical communication channel established between the communication sections of two electronic devices, between the control sections connected to corresponding communication sections, and providing a predefined communication procedure used between the communication sections or the communication section and control sections within the same electronic device.

With the construction described above, when a control section of an electronic device requests an establishment of a secondary logical communication channel to the communication section of the same electronic device, by using the communication procedure predefined between the control section and communication section, via means provided in the control section and in the communication section for transferring a message therebetween, a primary logical communication channel is established between the communication section and another communication section of a communication destination electronic device, and the other communication section notifies another control section of the communication destination electronic device of the fact that a secondary logical communication channel is to be established between the control section and other control section, via means provided in the other communication section and in the other control section for transferring a message therebetween, and when the other control section returns an establishment response of the secondary logical communication channel back to the communication originating electronic device via the other communication section, the communication section of the secondary logical communication channel establishment requesting electronic device notifies the control section of the confirmation of the secondary logical communication channel establishment via the primary logical communication channel established between the communication section and other communication section, thereby realizing an exclusive control between control sections of different electronic devices.

In order to achieve the above object, according to the second embodiment of this invention, exclusive control between control sections is realized by providing means for transferring a message in a communication section and in a control section of each electronic device connected to a common signal transmission line, providing in the control section means for establishing a secondary logical communication channel between the control sections connected to corresponding communication sections, and providing a predefined communication procedure used between the communication sections or the communication section and control sections within the same electronic device.

With the construction described above, when a control section of an electronic device requests an establishment of a secondary logical communication channel to the communication section of the same electronic device, by using the communication procedure predefined between the control section and communication section, via means provided in the control section and in the communication section for transferring a message therebetween, another communication section of a communication destination electronic device notifies another control section of the communication destination electronic device of the fact that a secondary logical communication channel is directly established between the control section and other control section, via means provided in the other communication section and in the other control section for transferring a message therebetween, and when the other control section returns an establishment response of the secondary logical communication channel back to the communication section, the communication section of the secondary logical communication channel establishment requesting electronic device notifies the control section of the confirmation of the secondary logical communication channel establishment, thereby realizing an exclusive control between control sections of different electronic devices on the control section unit basis.

BRIEF DESCRIPTION OF THE DRAWINGS

FIGS. 4a-4c is a flow chart showing the transmission procedure by the control section requesting the establishment of a logical communication channel according to the first embodiment of this invention, FIG. 5a-5c is a flow chart showing the reception procedure by the control section which was requested to establish a logical communication channel, FIG. 7 shows the format of a message used in common with the first and second embodiments of this invention and prior art, FIG. 8 is a diagram showing the definition of the control bits shown in FIG. 7 and used in common with the first and second embodiments of this invention and a prior art, FIG. 9 shows a conventional communication procedure, FIG. 15a-15c shows the reception procedure by the control section and communication section which was requested to establish the secondary logical communication channel according to the second embodiment of this invention, FIG. 16 shows the definition of control bit values in the control bit (CB) field according to the second embodiment of this invention, FIG. 17 shows the format of a message to be transferred via the signal transmission line according to the second embodiment of this invention.

DESCRIPTION OF THE PREFERRED EMBODIMENTS

1st Embodiment

Figure 1:
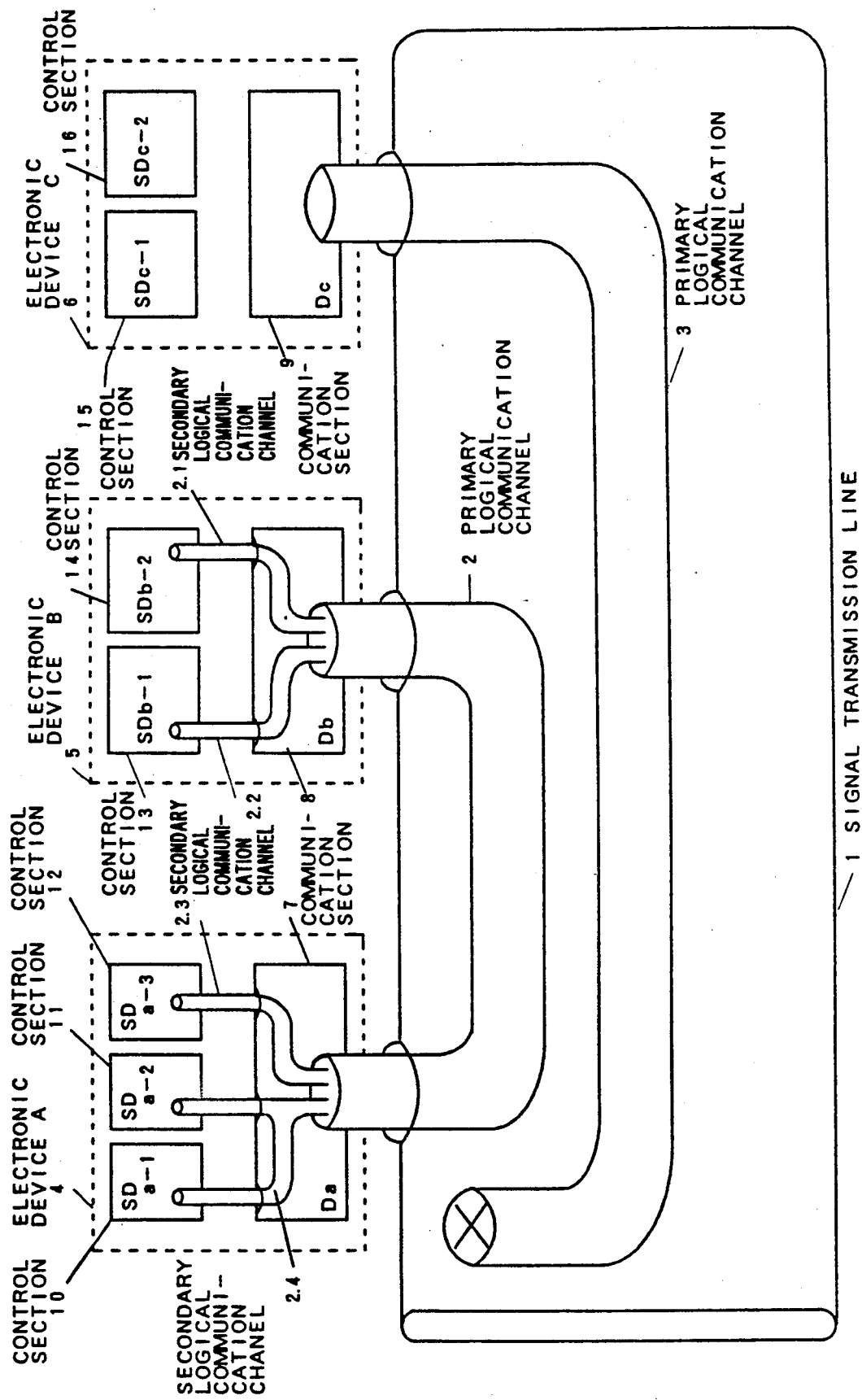
FIG. 1 shows the logical structure of a logical communication system according to the first embodiment of this invention.
Figure 2:
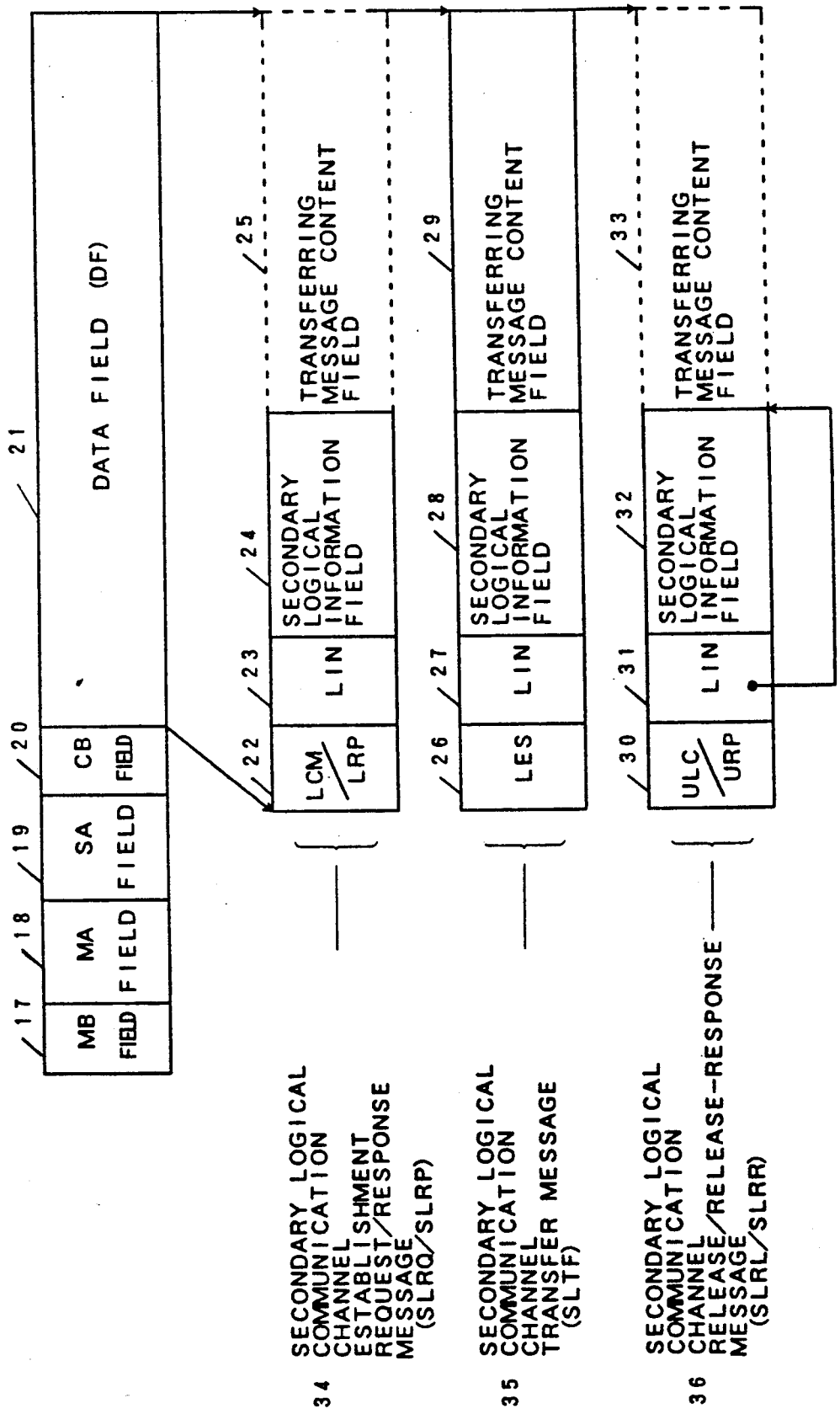
FIG. 2 is message format according to the first embodiment of this invention.
Figure 3:
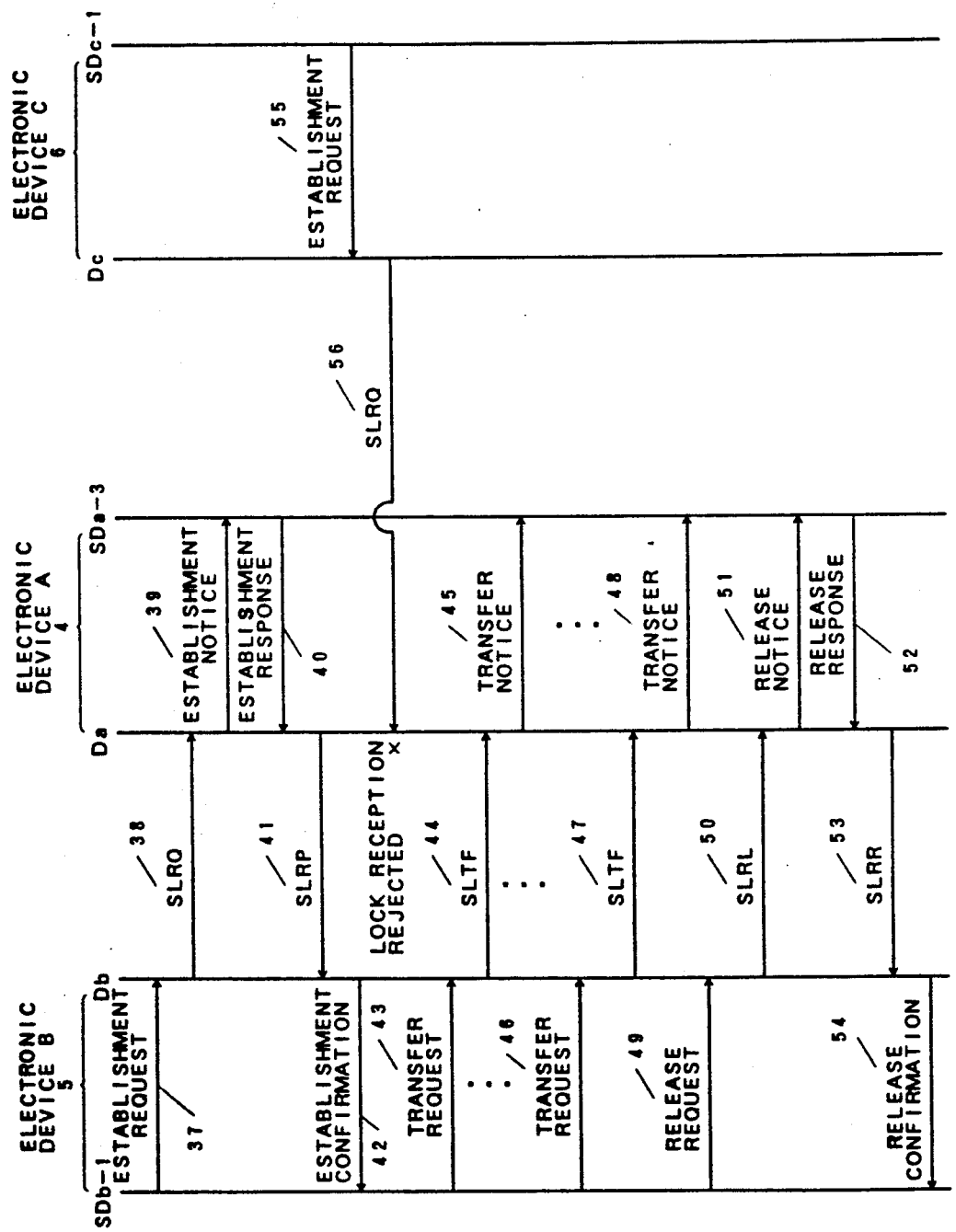
FIG. 3 is the transmission/reception sequence of a message to be transferred between electronic devices according to the first embodiment of this invention.

FIG. 1 shows the logical structure of a logical communication system of electronic devices according to the first embodiment of this invention, using a primary logical communication channel and a secondary logical communication channel. FIG. 2 shows the format of a message to be transferred via the signal transmission line of this embodiment. FIG. 3 shows the communication procedure illustrating the transmission/reception sequence of a message between the control section and communication section of an electronic device, and between the communication sections of different electronic devices, according to this embodiment, FIG. 4 shows the transmission procedure by the control section and communication section of the electronic device which requests to establish the secondary logical communication channel, according to this embodiment, FIG. 5 shows the reception procedure by the control unit and communication section of the electronic device which is requested to establish the secondary logical communication channel, according to this embodiment, and FIG. 6 shows the system construction according to this embodiment and a prior art configuration.

Figure 4B:
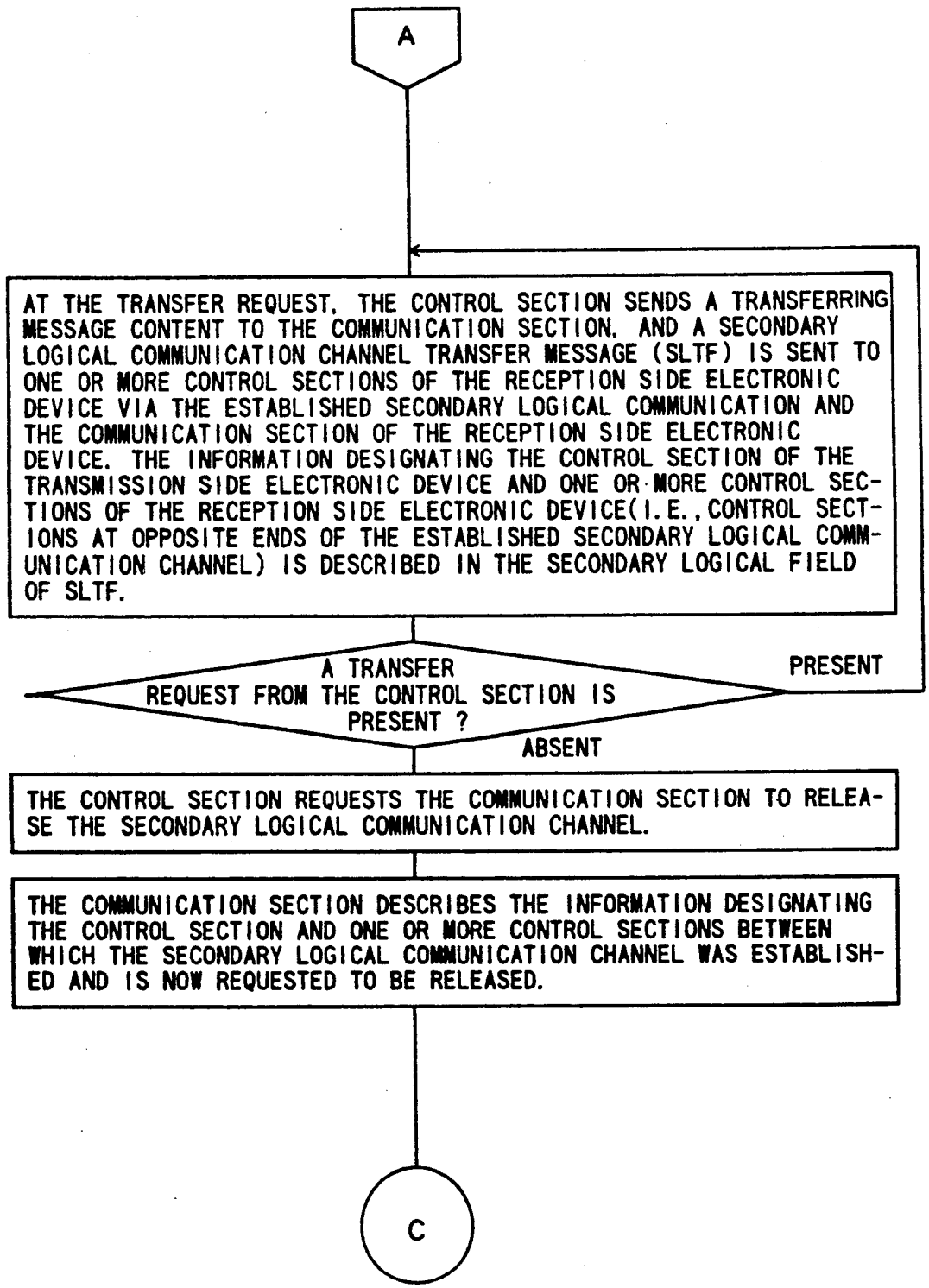
Figure 4C:
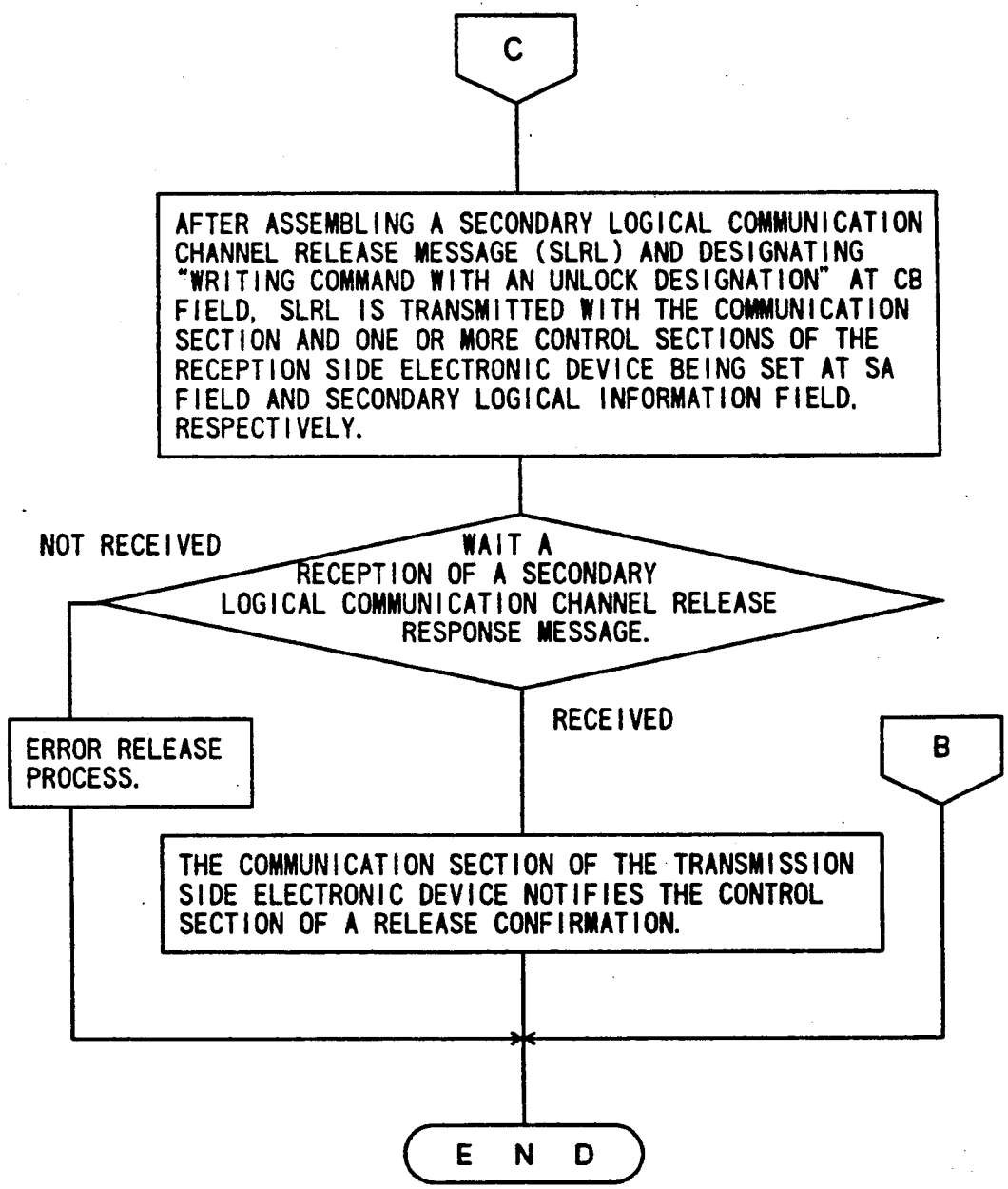
Figure 6:
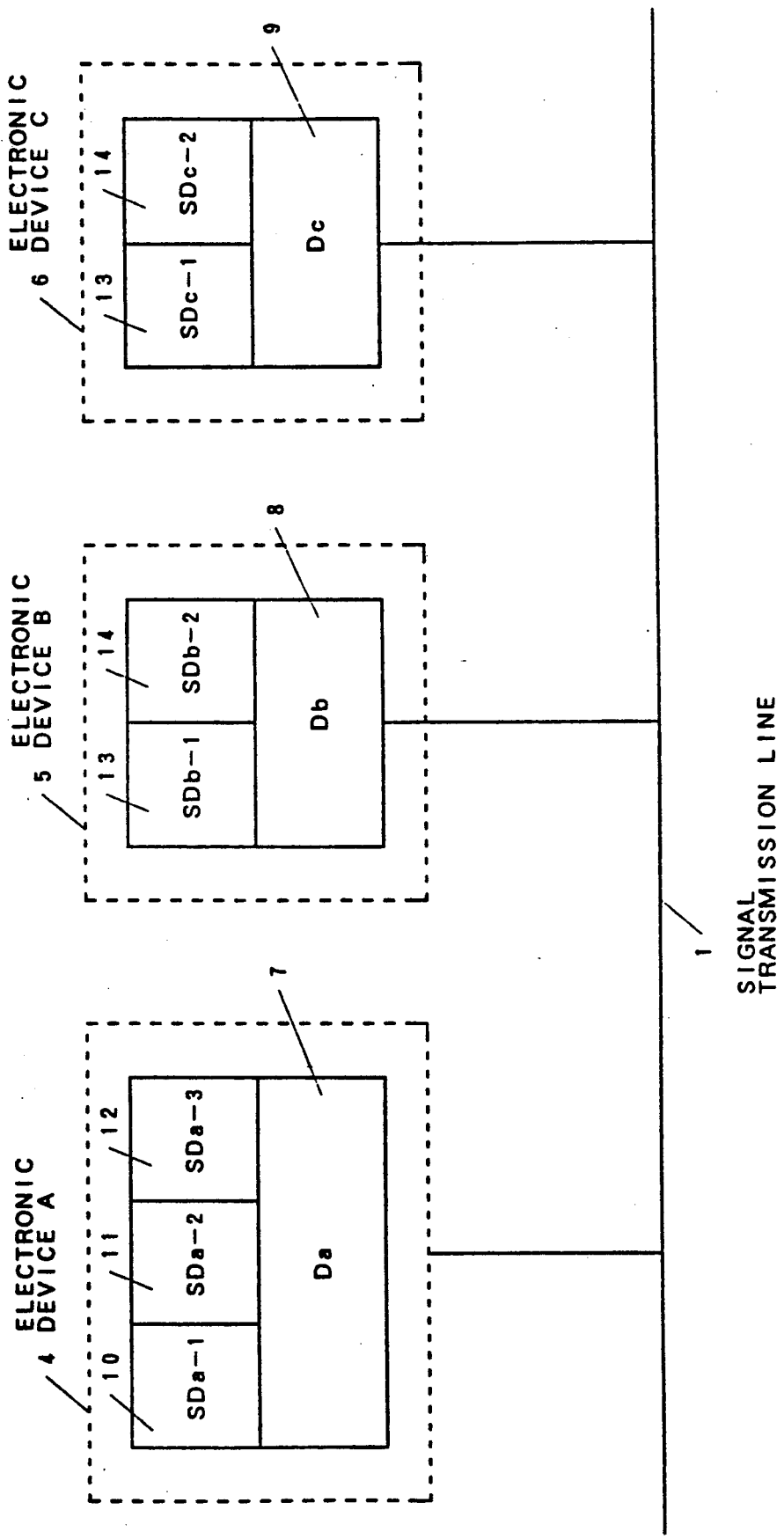
FIG. 6 shows the system construction according to the first and second embodiments of this invention and a prior art.
Figure 10:
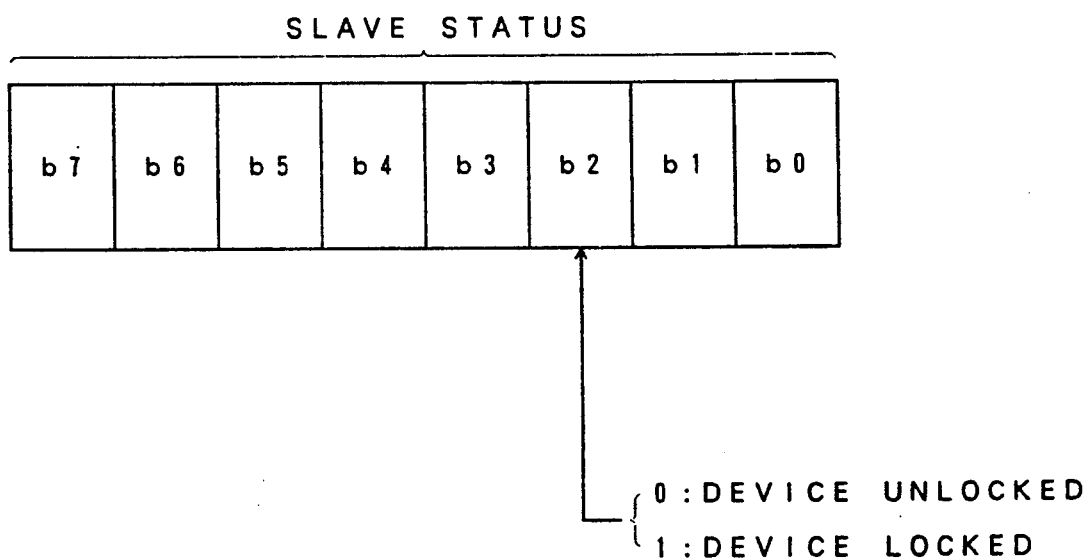
FIG. 10 shows the definition of the slave status used in common with the first and second embodiments of this invention and a prior art.
Figure 11:
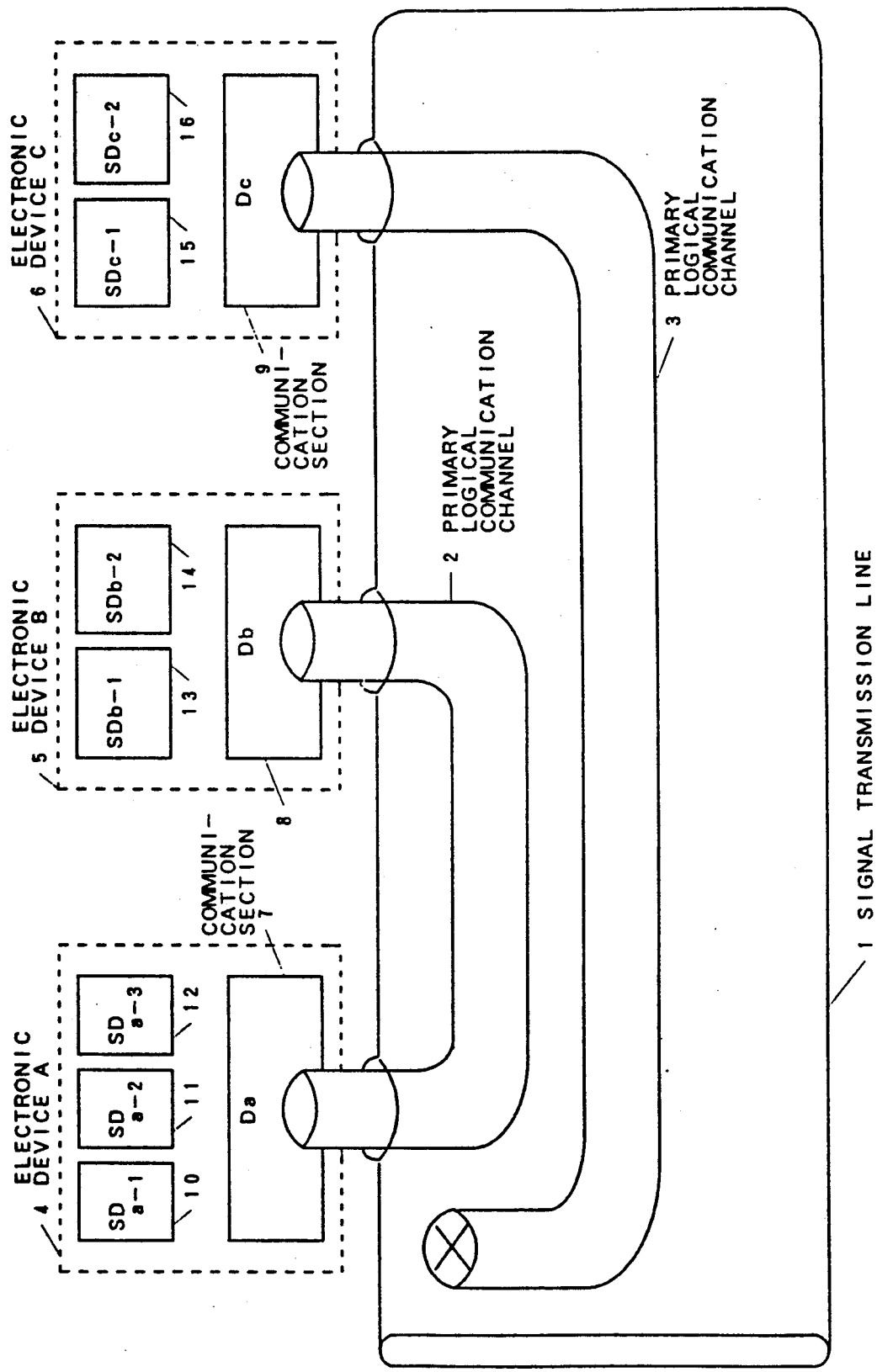
FIG. 11 shows the logical structure of a logical communication system according to a prior art.

The present invention is not limited to the embodiment shown by the logical structure of FIG. 1, the message format of FIG. 2, the communication procedure of FIG. 4, the transmission procedure of FIG. 4, the reception procedure of FIG. 5, and the system construction of FIG. 6.

Referring to FIG. 1, reference numeral 1 represents a signal transmission line made of transmission medium along which a message is transmitted. Reference numerals 2 and 3 represent a primary logical communication channel established on the signal transmission line 1. Reference numerals 2.1, 2.2. 2.3 and 2.4 represent a secondary logical communication channel established on the primary logical communication channel between control sections. Reference numerals 4, 5 and 6 represent an electronic device which is connected to the common signal transmission line 1. Reference numerals 7, 8 and 9 represent a communication section provided in the electronic device for transferring a message between electronic devices by establishing the primary logical communication channel 2 or 3 on the signal transmission line 1. Reference numerals 10, 11, 12, 13, 14, 15 and 16 represent a control section. Each control section within the electronic device performs a service or function specific to the control section. In other words, each control section has at least one specific function of an inner-device basis (such as a video monitor function, audio amplifier function, VTR function, camera function, CD-ROM function and other functions). The control section processes and executes the information contents (data or command) described in the data field within the frame of a message.

The communication section executes the communication control for sending and receiving a message on an inter-device basis.

The control section has a communication control function to establish or release a secondary logical communication channel for transferring a message between the electronic devices via the secondary logical communication channel newly established on the primary communication channel established between the communication sections.

Referring to FIG. 2, a mode bit (MB) field 17 is used in determining the transmission rate of the fields following this field 17, and in determining the transmission priority order by using a collision detection procedure when messages are transmitted to the signal transmission line from a plurality of electronic devices at the same time. A master address (MA) field 18 has therein a predetermined value of an originating device. A slave address (SA) field 19 has therein a predetermined value of a terminating device. A control bit (CB) field 20 has therein a value as defined in Table shown in FIG. 8 to instruct a lock or unlock for the establishment or release of the primary logical communication channel. A data field (DF) 21 has therein a secondary logical communication channel establishment request/response message (SLRQ/SLRP) 34, secondary logical communication channel transfer message (SLTF) 35, or secondary logical communication channel release/release-response message (SLRL/SLRR). A field 22 has therein an LCM discriminator indicating an establishment of the secondary logical communication channel, or an LRP discriminator indicating an establishment response of the secondary logical communication channel. A field 23 has therein a length indicator (LIN) indicating the octet length of a secondary logical information field 24 and transferring message content field 25. The secondary logical information field 24 has therein the identification name, number or the like of the control section which intends to establish the secondary logical communication channel. The transferring message content field 25 is an optional field which is added if the secondary logical communication channel establishment request/response message includes an information data to be transferred via the secondary logical communication channel. A field 26 has therein an LES discriminator indicating a data transfer via the secondary logical communication channel. A field 27 has therein a length indicator (LIN) indicating the octet length of the secondary logical information field 28 and transferring message content field 29. The field 28 has therein the same definition as that of the secondary logical information field 24. A field 29 has therein the same definition as that of the transferring message content field 25. This field 29 is added essentially by all means. A field 30 has therein a ULC discriminator representative of a secondary logical communication channel release or a URP discriminator representative of a secondary logical communication channel release response. A field 31 has therein an LIN having the same definition as that of LIN field 23. A field 32 is a secondary logical information field having the same definition as that of the secondary logical information field 24. A field 33 is a transferring message content field having the same definition as that of the transferring message content field 25.

Referring to FIG. 3, at an establishment request 37, the control section (SDb-1) of the electronic device B 5 transmits to its communication section (Db) an additional parameter information necessary for the establishment of the secondary logical communication channel. By using the parameter information given by the establishment request 37, the secondary logical communication channel establishment request message (SLRQ) shown in FIG. 2 representative of the first and second logical communication channel establishment is formed and transmitted to the destination electronic device A 4. At an establishment notice 39, the communication section (Da) of the electronic device A 4 notifies, by using the acknowledgement bit (A) 61 shown in FIG. 7 of CB field 20 shown in FIG. 2, the electronic device B 5 of the fact that SLRQ 38 has been received from the signal transmission line and acknowledged and that the primary logical communication channel has been established in accordance with the lock request indicated by the control bit field of SLRQ 38, and the communication section (Da) requests the control section (SDa-3) of the electronic device A 4 shown in FIG. 3 and designated by the secondary logical information field 24 shown in FIG. 2 of SLRQ 38 to establish the secondary logical communication channel between the control section (SDb-1) of the electronic device B 5. At an establishment response 40, in order to respond to the electronic device B 5 the control section (SDa-3) informs the communication section (Da) of the fact that the establishment notice 39 has been received and processed normally by the control section (SDa-3) and the designated and requested secondary logical communication channel has been established. Reference numeral 41 represents an SLRP indicating a secondary logical communication channel establishment response message obtained by designating an LRP in the field 22 shown in FIG. 2 in accordance with the response parameter given by the establishment response 40 and by editing the secondary logical information field 24. At an establishment confirmation 42, the communication section of the electronic device B 5 received the SLRP 41 notifies the control section (SDb-1) of the fact that the secondary logical communication channel has been acknowledged to be established at the control section (SDa-3) of the electronic device A 4 on the primary logical communication channel already established by SLRQ 38. At transfer requests 43 and 46, the control section (SDb-1) of the electronic device B 5 notifies the communication section (Db) of the transfer request when the former knows the fact that the secondary logical communication channel has been established at the control section (SDa-3) of the electronic device A 4 upon reception of the establishment confirmation 42, and assumes that the secondary logical communication channel can be used. The transfer request includes the information that one message is transferred or a plurality of messages are transferred divisionally, together with the message contents and the parameters identifying the secondary logical communication channel. In accordance with the parameters given at the transfer request from the control section (SDb-1), SLTF messages 44 and 46 of the format shown in FIG. 2 each are transferred to the communication section (Da) of the destination electronic device A 4. In the SLTF message, LES 26 and LIN 27 are designated in the data field (DF) 21 as the secondary logical communication channel transfer message 35, and the parameter identifying the secondary logical communication channel is set in the secondary logical information field 28 by using the previously determined description. At transfer notices 45 and 48, the communication section (Da) received SLTFs 44 and 47 refers to the lock designation in the CB field 20 and the secondary logical information field in the data field (DF) 21 of the message shown in FIG. 2, discriminates the destination control section (SDa-3) having the established secondary logical communication channel designated by the secondary logical information field 28, and thereafter transfers to the control section (SDa-3) of the electronic device A 4 the contents of the transferring message content field 29 and a part or all of the contents of the secondary logical information field 28. At a release request 49, the control section (SDb-1) supplies to the communication section (Db) the parameters necessary for forming a message SLRL 50 which indicates an establishment release of the secondary logical communication channel used between the control section (SDb-1) of the electronic device B 5 and the control section (SDa-3) of the destination electronic device A 4, when it becomes unnecessary to transfer a further message between the control sections using the secondary logical communication channel. The message SLRL 50 includes an unlock designation in the CB field 20 of the message shown in FIG. 2, and ULC 30, LIN 31 and the secondary logical information field 32 for designating the secondary logical communication channel to be released, as the secondary logical communication channel release message 36, in the data field (DF) 21. The acknowledging bit (A) 61 shown in FIG. 7 in the CB field 20 of the SLRL message indicates that the primary logical communication channel between the communication channels (Db and Da) has been completely and correctly released. At a release notice 51, by using as the parameter the designation information, included in the contents of the secondary logical information field 32 shown in FIG. 2 and transmitted by SLRL 50, for designating the control sections of the electronic devices A 4 and B 5 at opposite ends of the secondary logical communication channel, the communication section (Da) of the electronic device A 4 with the primary logical communication channel already released upon reception of SLRL 50, requests the control section (SDa-3) to release the secondary logical communication channel, and to return the release result. At a release response 52, the communication section (Da) of the electronic device A 4 is supplied as the parameters with the fact that the release completion result of the secondary logical communication channel by the release notice is to be responded to the control section (SDb-1) of the electronic device B 5. An SLRR message 53 is a secondary logical communication channel release response message of the data field (DF) 21 shown in FIG. 2 formed at the communication section (Da) by using the parameters given at the release response 52. At a release confirmation 54, the communication section (Db) of the electronic device B 5 informs, the control section (SDb-1) of the electronic device B 5 identified by the secondary logical information field 32 shown in FIG. 2 of SLRR 53, of the fact that the secondary logical communication channel release completion response has been received from the destination device At an establishment request 55, a message is sent from the control section (SDc-1) of the electronic device C 6 to the electronic device A 4 via the communication section (Dc) An SLRQ message 56 is the secondary logical communication channel establishment message in the format as shown in FIG. 2 which is sent from the communication section (Dc) of the electronic device C 6 to the communication section (Da) of the electronic device A 4.

The communication procedure of the system constructed as above will be described below.

With reference to FIG. 1 showing the logical communication interconnection of the electronic device system shown in FIG. 6, the establishment procedure or release procedure of the secondary logical communication channel by the control section (SDb-1) of the electronic device B 5 relative to the control section (SDa-3) of the electronic device A 4 by using the messages shown in FIG. 2 is shown in FIG. 4 as the transmission procedure by the control section (SDb-1) which requests the establishment of the secondary logical communication channel, and in FIG. 5 as the reception procedure by the control section (SDa-3) which is notified of the establishment of the secondary logical communication channel. The flow of the procedure shown in FIGS. 4 and 5 will be described below.

FIG. 4 shows the procedure executed by the control section requesting the establishment of the secondary logical communication channel wherein the secondary logical communication channel is established on the primary logical communication channel to be established for example between the control section of the electronic device B 5 having the logical structure as shown in FIG. 1 and the control section of the electronic device A 4, a message transfer between the control sections is requested via the secondary logical communication channel, and after the transfer the secondary logical communication channel is requested to be released. FIG. 3 shows a communication sequence wherein the transmission procedure shown in FIG. 4 is applied to the electronic device B 5.

SLRQ 56 shown in FIG. 3 indicates that the flow of the transmission procedure shown in FIG. 4 is applied to the control section (SDc-1) 15 of the electronic device C 6. Before the reception of the secondary logical communication channel establishment request by the control section (SDa-3) of the electronic device A 4 shown in FIG. 1, the primary logical communication channel 2 has been established between the electronic device A 4 having the communication section (Da) 7 and the electronic device B 5. Therefore, the establishment request for the primary logical communication channel 3 which is to be established for the establishment of the secondary logical communication between the electronic device A 4 and the electronic device C 6, is rejected as the request for locking is not accepted.

FIG. 5 shows the procedure executed by the control section to which the secondary logical communication channel is notified to be released, wherein the control section of the electronic device A 4 for example having the logical structure as shown in FIG. 1 is requested to establish the secondary logical communication channel on the primary logical channel to be established relative to the control section of the electronic device B 5, returns the establishment response, receives via the secondary logical communication channel a notice of a message transfer from the control section of the electronic device B 5 as many times as necessary, after the reception of the necessary number of message transfers, completely releases the secondary logical communication channel upon reception of the release notice of the presently used secondary logical communication channel by the electronic device A 4, and returns the release completion result to the control section of which requested the release of the secondary logical communication channel.

By using the procedure by the transmission side control section and the procedure by the reception side control section respectively shown in FIGS. 4 and 5, and by using the various types and formats of messages shown in FIG. 2, there is provided a communication system having two types of secondary logical communication channels as shown in FIG. 1. Namely, there are provided a case A where the establishment/transfer/release of the secondary logical communication channel is conducted between one control section and another control section in one-to-one correspondence, and a case B where the establishment/transfer/release of the secondary communication channel is conducted between one control section and a plurality of other control sections in one-to-multiple correspondence.

In the case A, there is one control section which requests the establishment/release of the secondary logical communication channel and another control section which is requested to establish/release the secondary logical communication channel. A one-to-one communication on the secondary logical communication channel is effected by describing and designating the secondary logical information fields 24, 28 or 32 shown in FIG. 2 in accordance with the definition which defines the discrimination information for the requesting and requested control sections, and by applying the procedures shown in FIGS. 4 and 5 to the corresponding control sections.

The communication sequence shown in FIG. 3 corresponds to the case A wherein a one-to-one communication on the secondary logical communication channel is effected between the control section (SDb-1) 13 and the control section (SDa-3) 12.

In the case B, there is one control section which requests the establishment/release of the secondary logical communication channel, and at least two or more control sections which are requested to establish/release the secondary logical communication channel. Namely, the one-to-multiple communication on the secondary logical communication channel is effected by describing and designating the secondary logical information fields 24, 28 or 32 shown in FIG. 2 in accordance with the definition which defines the discrimination information for the one requesting control section and the at least two or more requested control sections, and by applying the transmission and reception procedures shown in FIGS. 4 and 5 to the one requesting control section and the at least two or more requested control sections As the case B, for example, the secondary logical communication channel is established on the first logical communication channel established between the communication section (Db) 8 of the electronic device B 5 and the communication section (Db) 7 of the electronic device A 4 respectively shown in FIG. 1, between one control section (SDb-2) 14 of the electronic device B 5 and two control sections (SDa-1) 10 and (SDa-2) 11 of the electronic device A 4. In this case, the secondary logical communication channel 2.1 at the electronic device B 5 and the secondary logical communication channel 2.4 at the electronic device A 4 respectively shown at opposite ends of the primary logical communication channel 2 are constructed of the same single secondary logical communication channel. By using the established single secondary logical communication channel, and in accordance with the combination of destination control sections described by the secondary logical information field 28 of the secondary logical communication channel transfer message (SLTF) 35 shown in FIG. 2, a message is transferred in a one-to-one communication between the control section (SDb-2) 14 and the control section (SDa-1) 10 or between the control section (SDb-2) 14 and the control section (SDa-2) 11, or alternatively a message is transferred in a one-to-multiple communication between the control section (SDb-2) 14 and the control sections (SDa-1) 10 and (SDa-2) 11, by describing the contents of the broadcast message in the transferring message content field 29 using the single SLTF 35, and by describing the designation of the destination control sections in the secondary information field 28. By using the case A or B and establishing the secondary logical communication channel between control sections of one and another electronic devices, communication between control sections can be exclusively carried out.

As described above, there are provided, in the control section, communication means between a communication section and a control section, and means for establishing a secondary logical communication channel on a primary logical communication channel established between communication sections, the secondary logical communication channel being used between the control sections of different electronic devices. Therefore, exclusive communication control becomes possible for message transfer between control sections by using an efficient and simple communication sequence.

2nd Embodiment

Figure 12:
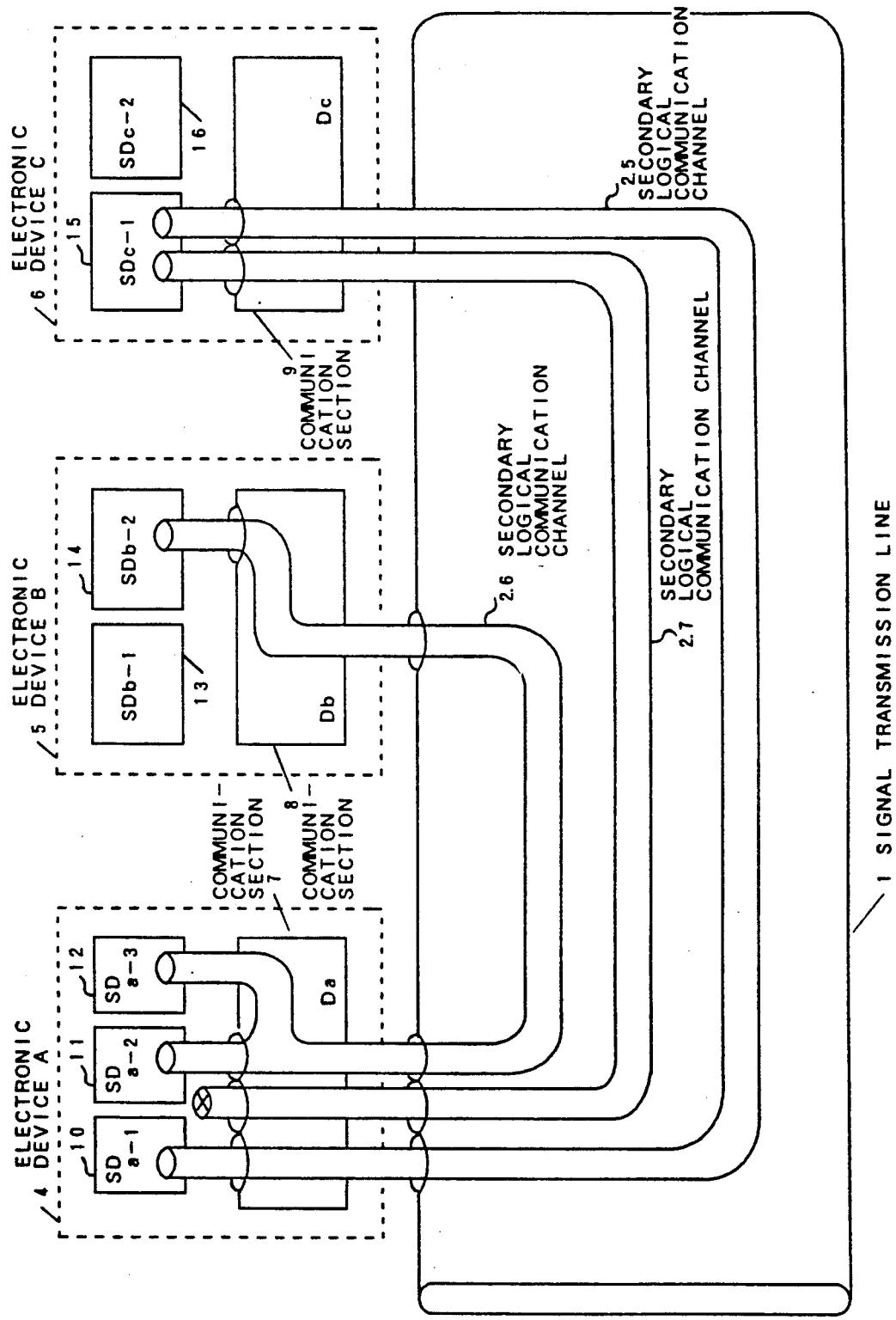
FIG. 12 shows the logical structure of a logical communication system of electronic devices using a secondary logical communication channel according to the second embodiment of this invention.
Figure 13B:
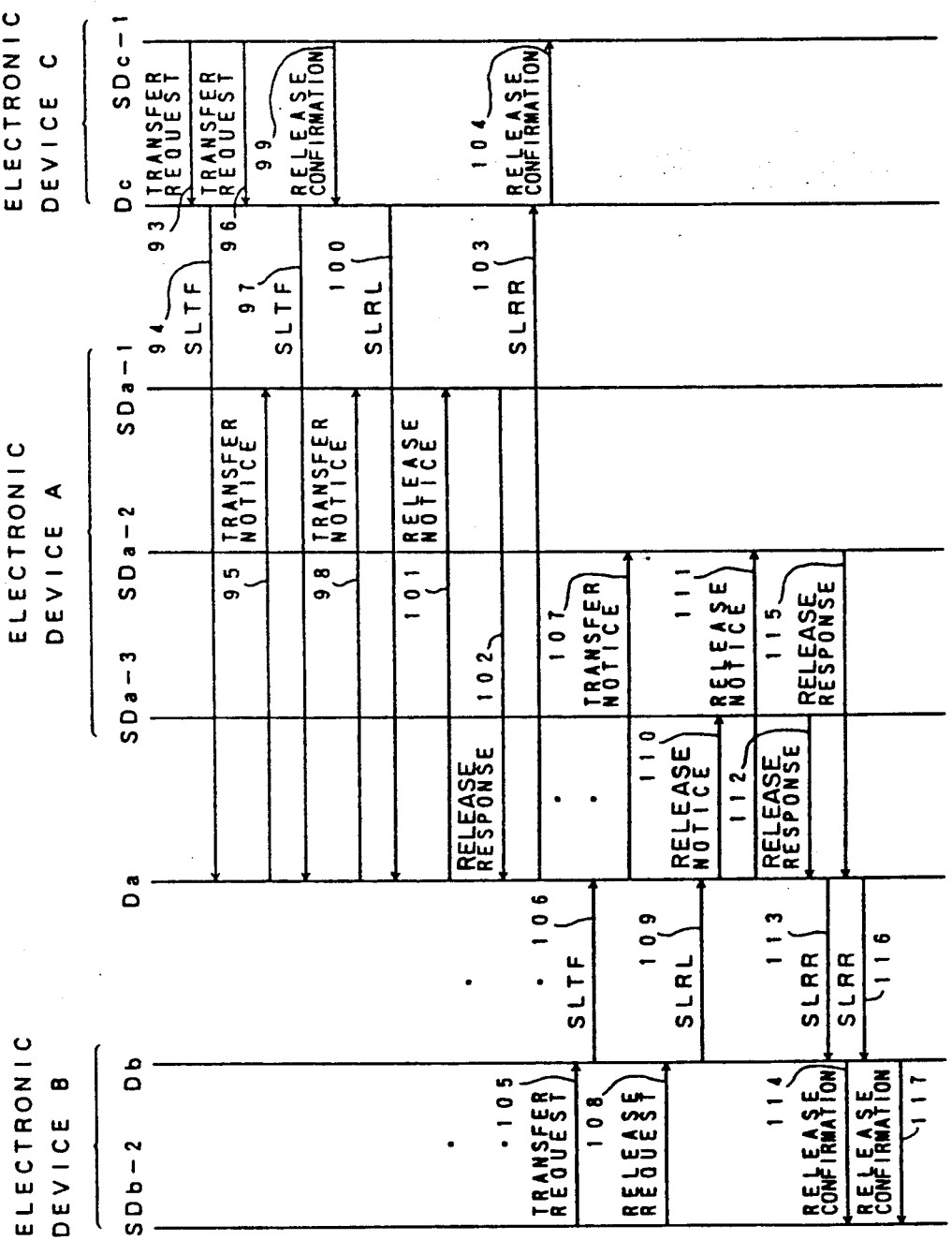
FIG. 13 shows the communication procedure illustrating the transmission/reception sequence of a message to be transferred between control sections according to the second embodiment of this invention.
Figure 14A:
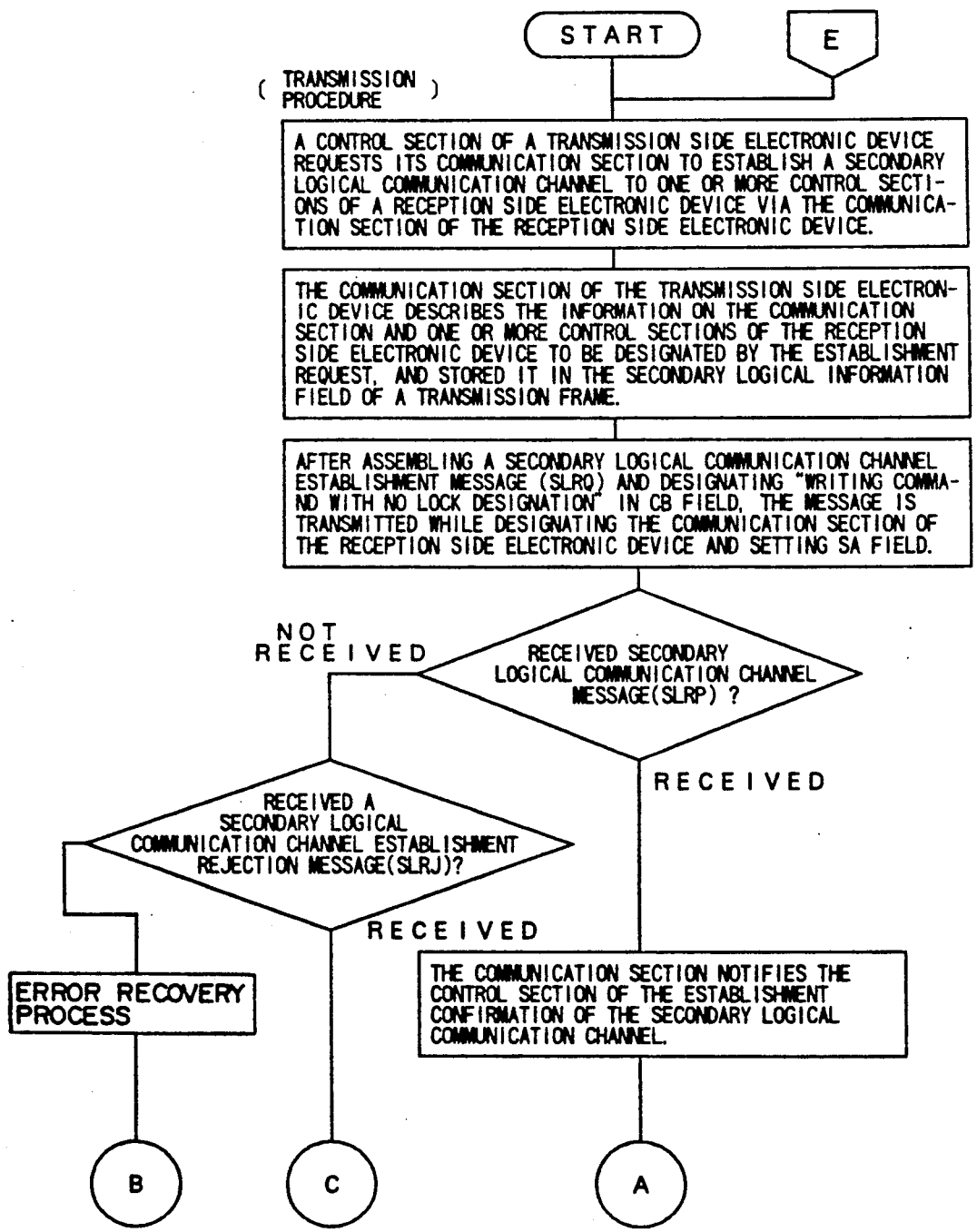
FIG. 14 shows the transmission procedure by the control section and communication section of an electronic device requesting the establishment of a secondary logical communication channel according to the second embodiment of this invention.
Figure 14C:
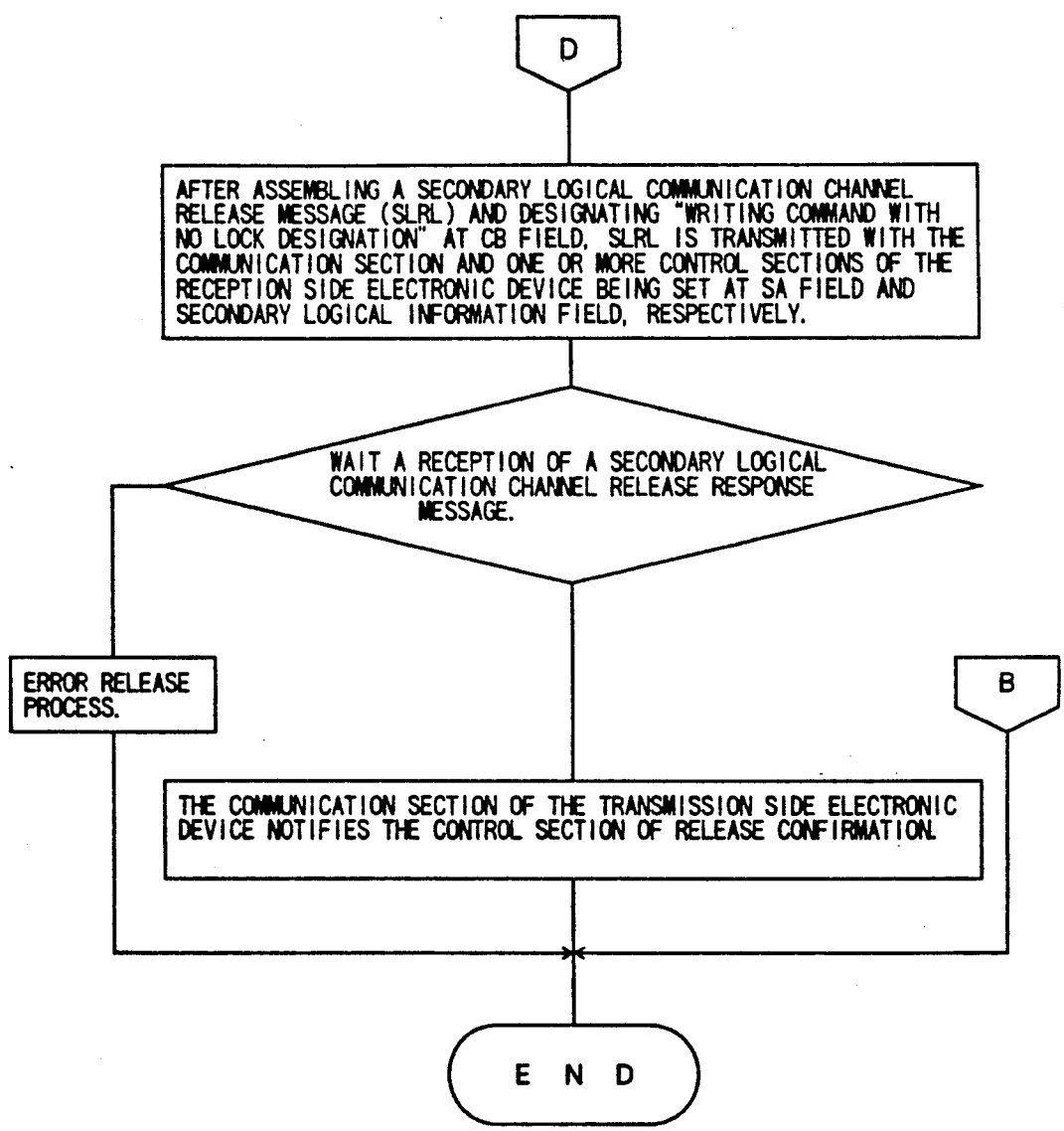
Figure 15B:
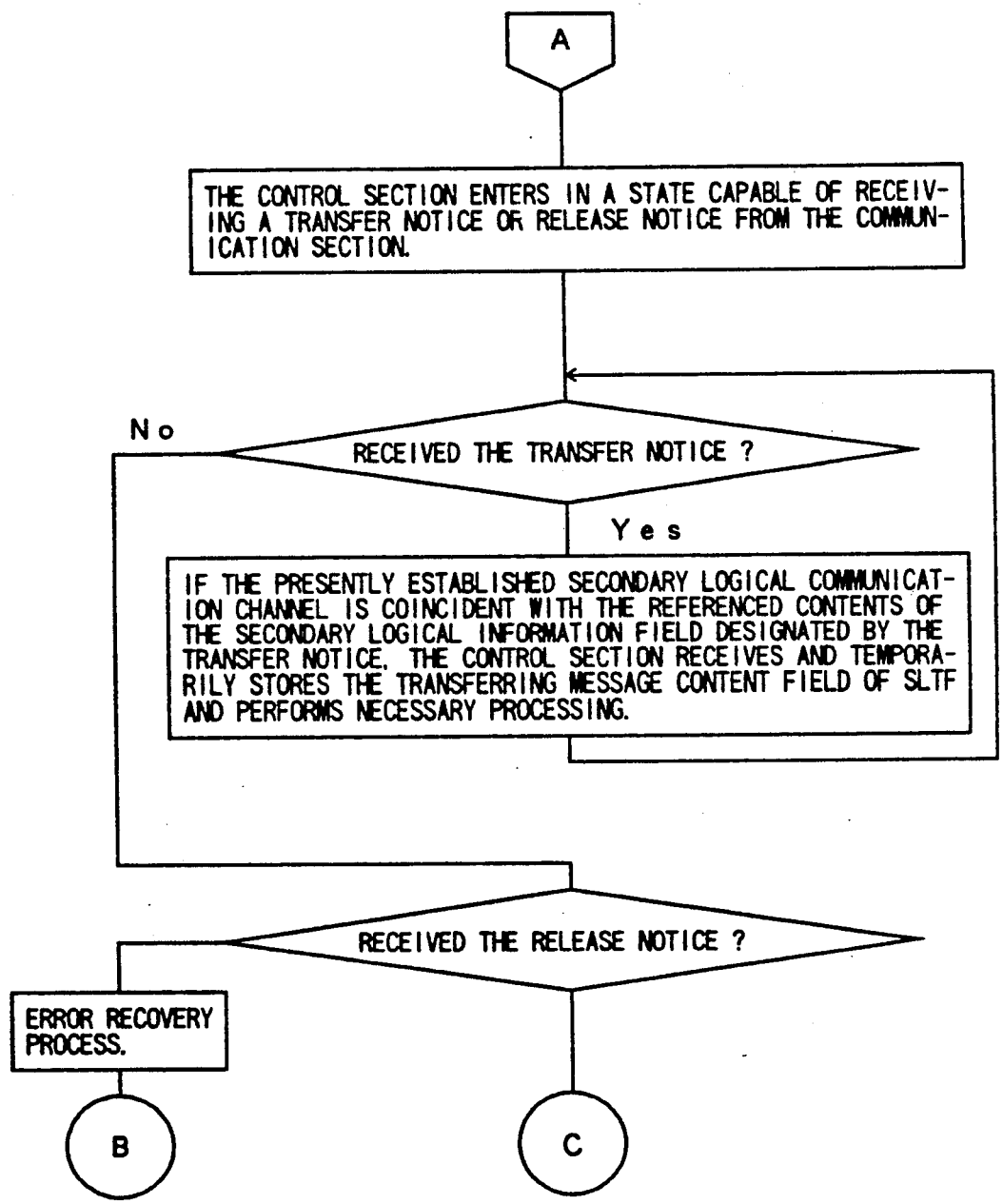
Figure 15C:
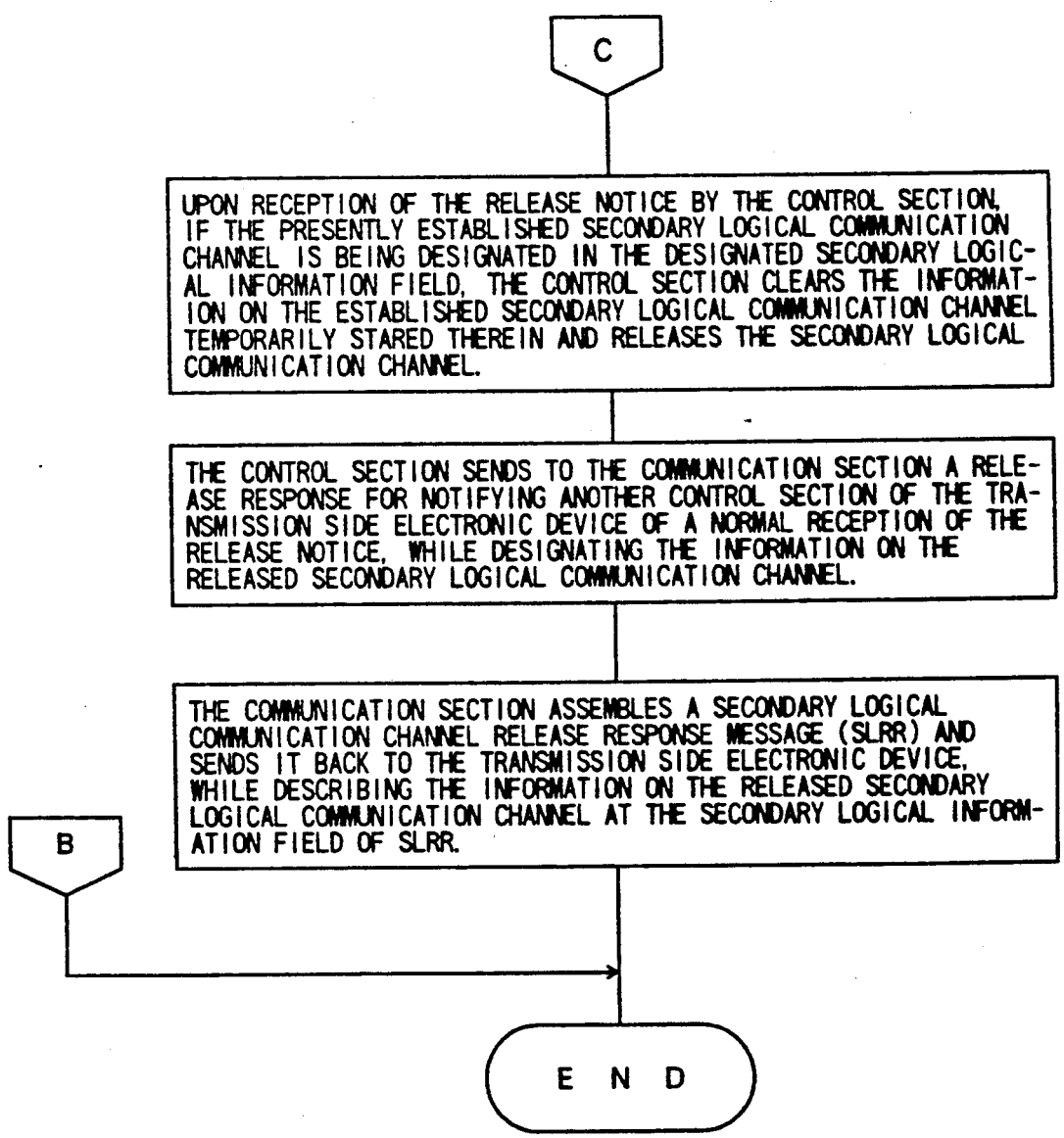
Figure 18B:
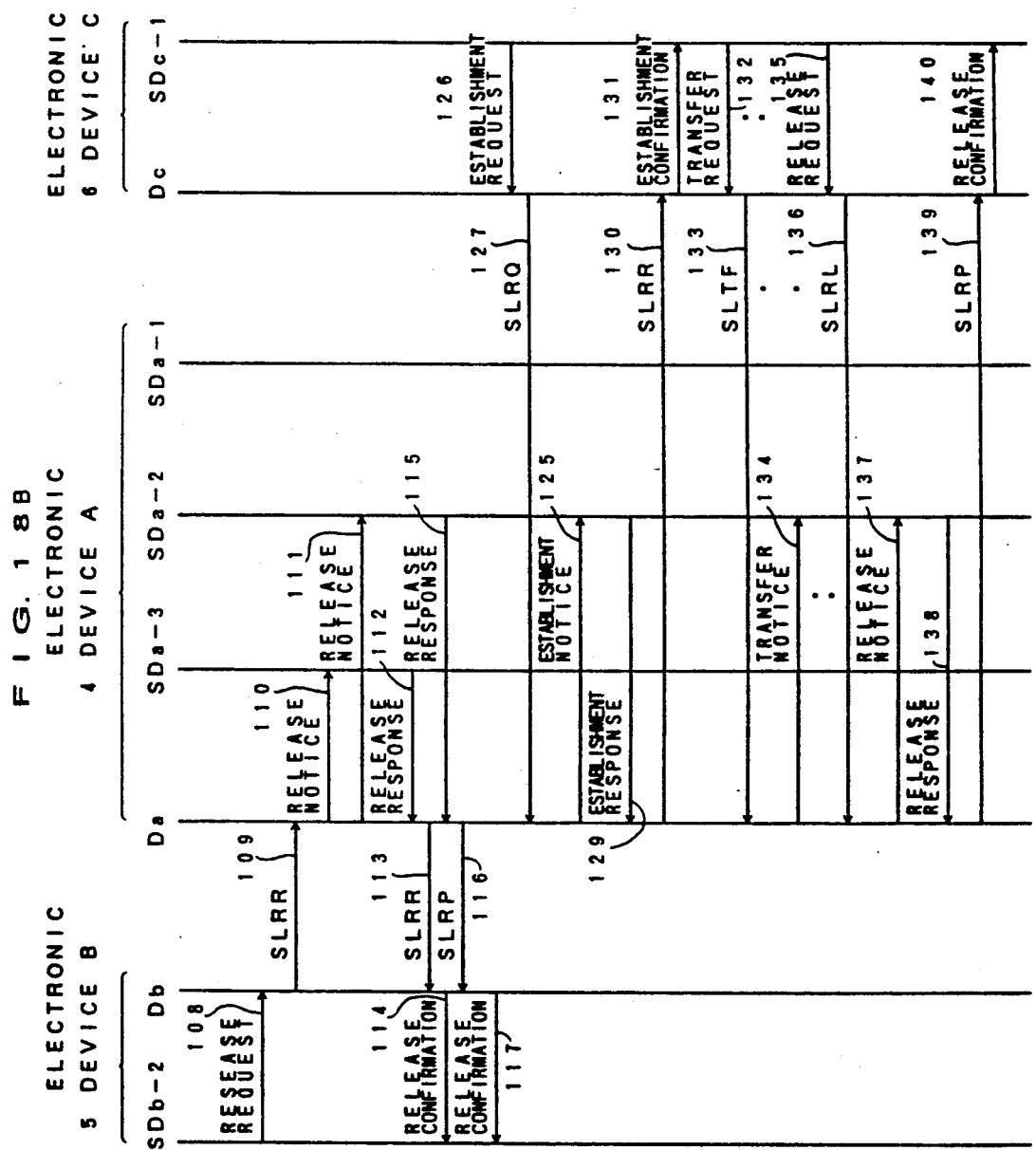
FIG. 18 shows transmission/reception timings of a secondary logical communication establishment error according to the second embodiment of this invention.

FIG. 12 shows the logical structure of a logical communication system of electronic devices using a secondary logical communication channel according to the second embodiment of this invention, FIG. 17 shows the format of a message transferred via a signal transmission line of this embodiment, FIG. 13 shows the communication procedure illustrating a transmission/reception sequence of a message transferred between the control section and communication section of an electronic device, and between the control sections of different electronic devices via the communication sections, FIG. 18 shows the transmission/reception sequence and transmission/reception timings of a message when there is an error of the establishment request for the secondary logical communication channel which is used as a logical communication channel between the control sections of electronic devices according to this embodiment, FIG. 14 shows the transmission procedure by the control section and communication section of an electronic device requesting the establishment of the secondary logical communication channel according to this embodiment, FIG. 15 shows the reception procedure by the control section and communication section of an electronic device which is requested to establish the secondary logical communication channel according to this embodiment, FIG. 6 shows the system construction used in common with this embodiment and a prior art, FIG. 7 shows the format of a message used in common with this embodiment and a prior art, and FIG. 16 shows the definition of control bit (CB) values in the control bit (CB) field used in this embodiment.

The invention is not limited to this embodiment shown by the logical structure of FIG. 12, the message format of FIG. 17, the communication procedure of FIG. 13, the transmission procedure of FIG. 14, the reception procedure of FIG. 15, the system construction of FIG. 6, the message format of FIG. 7, the definition of the control bits of FIG. 16, and the transmission/reception timings with a secondary logical communication channel establishment error of FIG. 18.

The elements not identical to those of the first embodiment will be described below.

Referring to FIG. 12, reference numerals 2.5 and 2.6 represent a secondary logical communication channel established on a signal transmission line 1 between the control sections of different electronic devices. Reference numeral 2.7 represents a secondary logical communication channel which was not established between the control sections of different electronic devices. Reference numerals 7, 8 and 9 represent a communication section which performs a communication control for the transmission/reception of a message via at least the signal transmission line 1 between a control section of one electronic device and a control section of another electronic device, the message including the contents of the data field (DF) shown in FIG. 17 and having the format as shown in FIG. 7. Reference numerals 10, 11, 12, 13, 14, 15 and 16 represent a control section provided in each electronic device for giving a service or function specific thereto and performing communication relative to one or more designated control sections of another electronic device by establishing a secondary logical communication channel.

Referring to FIG. 17, a control bit (CB) field 20 has therein the value defined by Table shown in FIG. 16. Reference numeral 21 represents a data field (DF) for describing therein a request/response/rejection message (SLRQ/SLRP/SLRJ) 118 for the secondary logical communication channel established between the control sections of different electronic devices, a secondary logical communication channel transfer message (SLTF) 35, or a secondary logical communication channel release/release-response message (SLRL/SLRR) 36. Reference numeral 119 represents a field for describing therein an LCM discriminator indicative of the secondary logical communication channel establishment, an LRP discriminator indicative of the secondary logical communication channel establishment response, or an LRJ discriminator indicative of the secondary logical communication channel establishment rejection.

Referring to FIG. 13, reference numerals 71, 72, ..., 79, 80 represent a series of communication sequences including the sequences starting from generating an establishment request 71 for requesting to establish a first secondary logical communication channel between a control section SDb-2 (control section 14) of an electronic device B 5 shown in FIG. 12 and two control sections [SDa-3 (control section 12) and SDa-3 (control section 11)] of another electronic device A 4 via the respective communication sections 8 (Db) and 7 (Da), and to receiving the establishment confirmation 77 and 80 for confirming that the first secondary logical communication channel has been correctly established. Reference numerals 81, 82 and 83 represent a series of communication sequences for transferring data, commands and the like via the established first secondary logical communication channel from SDb-2 (control section 14) to SDa-3 (control section 12). Reference numerals 84, 85 and 86 represent a series of communication sequences for transferring data, commands and the like via the established first secondary logical communication channel from SDb-2 (control section 14) to SDa-2 (control section 11). Reference numerals 105, 106 and 107 represent a series of communication sequences for transferring data, commands and the like via the established first secondary logical communication channel from SDb-2 (control section 14) to SDa-2 (control section 11). Reference numerals 108, 109, ..., 116, 117 represent a series of communication sequences starting from the release request to release confirmation for use in releasing the first secondary logical communication channel established by the series of communication sequences 71, 72, ..., 79, 80. Reference numerals 87, 88, ..., 92 represent a series of communication sequences including the sequences starting from generating an establishment request 87 for requesting to establish a second secondary logical communication channel between a control section SDc-1 (control section 15) of an electronic device C 6 shown in FIG. 12 and a control section SDa-1 (control section 10) of another electronic device A 4 via the respective communication sections 9 (Dc) and 7 (Da), and to receiving the establishment confirmation 92 for confirming that the second secondary logical communication channel has been correctly established. Reference numerals 93, 94, 95 and 96, 97, 98 represent a series of communication sequences for transferring data, commands and the like via the established second secondary logical communication channel from SDc-1 (control section 15) to SDa-1 (control section 10). Reference numerals 99, 100, 101, 102, 103, 104 represent a series of communication sequences starting from the release request to release confirmation for use in releasing the second secondary logical communication channel established by the series of communication sequences 87, 88, ..., 92.

Referring to FIG. 16, the CB value b3b2b1b0 = "1100" indicates writing command (WC) with no lock designation, and the CB value b3b2b1b0 = "1101" indicates writing data with no lock designation.

Referring to FIG. 18, Reference 71, 72, ..., 85, 86, and 105, 106, ..., 116, 117 represent the same definitions as in FIG. 13. Reference numerals 120, 121 and 122 represent a series of communication sequences whereby a control section SDc-1 (control section 15) generates an establishment request 87 for the establishment of a third secondary logical communication channel 2.7 shown in FIG. 12 between the control section SDc-1 (control section 15) of the electronic device C 6 shown in FIG. 12 and a control section SDa-2 (control section 11) of the electronic device A 4 via the respective communication sections 9 (Dc) and 7 (Da), thereafter a secondary logical communication channel establishment message (SLRQ 121) is transmitted from the communication section 9 (Dc) to the communication section 7 (Da), and an establishment notice 122 for notifying the third secondary logical communication channel establishment is transmitted from the communication section 7 (Da) to the control section SDa-2 (control section 11). Reference numeral 123 represents an establishment rejection notified from the control section SDa-2 (control section 11) to the communication section 7 (Da), the establishment rejection indicating that since the control section SDa-2 (control section 11) is now occupied by the first secondary logical communication channel shown in FIG. 13 by the control section 14 (SDb-2) of the electronic device shown in FIG. 12, the establishment of the third secondary logical communication channel by the control section of another electronic device is to be rejected. Reference numeral 124 represents a secondary logical communication channel establishment rejection message (SLRJ) to the control section SDc-1 (control section 15) generated by the communication section 7 (Da) in response to the establishment rejection 123. Reference numeral 125 represents an establishment error indicating the secondary logical communication channel establishment rejection, which is sent from the communication section 9 (Dc) received SLRJ 124 to the control section SDc-1 (control section 15) requested the establishment of the third secondary logical communication channel. Reference numerals 126, 127, ..., 131 represent a series of communication sequences whereby including the sequences starting from generating an establishment request 126 for requesting to establish a third secondary logical communication channel between a control section SDc-1 (control section 15) of the electronic device C 6 shown in FIG. 12 and the control section SDa-2 (control section 11) of another electronic device A 4 via the respective communication sections 9 (Dc) and 7 (Da), and to receiving the establishment confirmation 131 for confirming that the third secondary logical communication channel has been correctly established. Reference numerals 132, 133 and 134 represent a series of communication sequences for transferring data, commands and the like via the established third secondary logical communication channel from SDc-1 (control section 15) to SDa-2 (control section 11). Reference numerals 135, 136, ..., 139, 140 represent a series of communication sequences starting from the release request to release confirmation for use in releasing the third secondary logical communication channel established by the series of communication sequences 126, 127, ..., 131.

The communication procedure of the system constructed as above will be described below.

With reference to FIG. 12 showing the logical communication interconnection of the electronic device system shown in FIG. 6, the establishment procedure of the secondary logical communication channel by the control section SDc-2 (control section 15) of the electronic device C 6 relative to the control section SDa-1 (control section 10) of the electronic device A 4 by using the messages shown in FIG. 17 is shown in FIG. 14 as the message transmission procedure by the control section which requests the establishment of the secondary logical communication channel, and in FIG. 15 as the message reception procedure by the control section which is notified of the establishment of the secondary logical communication channel. The flow of the procedure shown in FIGS. 14 and 15 will be described below.

FIG. 14 shows the procedure executed by the control section requesting the establishment of the secondary logical communication channel wherein the control section of the electronic device C 6 for example shown in FIG. 12 issues an establishment request to another control section of the electronic device a 4, a message is transferred via the established secondary logical communication channel between the control sections of the different electronic devices, and after transferring the message, the secondary logical communication channel is requested to be released. FIG. 13 shows the communication sequences wherein the transmission procedure shown in FIG. 14 is applied to the electronic devices B 5 and C 6. The CB values newly adopted as shown in FIG. 16 are used in the CB field 20 in a message shown in FIG. 17. A writing command (WC) with no lock designation of b3b2b1b0="1100" is applied to SLRQ, SLRP and SLRJ, a wirting command (WC) with no lock designation of b3b2b1b0="1100" or a writing data (WD) with no lock designation is applied to SLTF, and a writing command (WC) with no lock designation of b3b2b1b0="1100" is applied to SLRL and SLRP.

FIG. 15 shows the procedure executed by the control section which is notified of the secondary logical communication channel release, wherein a control section of the electronic device A 4 for example shown in FIG. 12 is requested by a control section of another electronic device C 6 to establish a secondary logical communication channel, after sending back the corresponding establishment response the control section logically coupled via the secondary logical communication channel to the control section of the electronic device A 4 which was requested to establish the channel receives via the secondary logical communication channel, receives a notice of a message transfer as many times as necessary from the control section of the electronic device C 6, after the reception of the necessary numbers of messages the secondary logical communication channel is completely released at the control section of the electronic device A 4 which received a release notice via the secondary logical communication channel from the control section of the electronic device C 6 which requested the establishment, and the release completion result is sent back as SLRR 103 to the control section which requested to release the secondary logical communication channel.

In the communication sequences shown in FIG. 13, by using the transmission procedure shown in FIG. 14 and the reception procedure shown in FIG. 15, first, the control section SDb-2 (control section 14) of the electronic device B 5 issues an establishment request 71, SLRQ 72 is notified via the communication sections 8 (Db) and 7 (Da) to the control sections SDa-3 (control section 12) and SDa-2 (control section 11) as the establishment notices 73 and 74 respectively, the corresponding establishment responses 75 and 78 are transmitted to the communication section 8 (Db) by using SLRP 76 and SLRP 79 respectively, and the control section SDb-2 (control section 14) is notified by using the establishment confirmation 77 and 80 of the fact that the secondary logical communication channel 2.6 shown in FIG. 12 has been established. Next, under the condition that the secondary logical communication channel 2.6 shown in FIG. 12 has been established, the control section SDc-1 (control section 15) of the electronic device C 6 different from the electronic device B 5 issues the establishment request 87 to the control section SDa-1 (control section 10) of the electronic device A 4 at which the secondary logical communication channel has not been established, the secondary logical communication channel 2.5 is established between the control sections SDc-1 (control section 15) and SDa-2 (control section 10) by executing a series of communication sequences shown in FIG. 13, and after transferring a necessary message, the control section SDc-1 (control section 15) issues a release request for the established secondary logical communication channel 2.5 and receives the release confirmation 104 indicating a reception of SLRR 103 representative of the release completion. Thereafter, the control section SDb-2 (control section 14) transfers a necessary message via the established secondary logical communication channel 2.6 to the control section SDa-2 (control section 11) or SDa-3 (control section 12), and the control section SDb-2 (control section 14) issues the release request 105 to release the secondary logical communication channel 2.6 by using the communication sequences from the release request 108 to the release confirmation 117 shown in FIG. 13.

In the communication sequences shown in FIG. 18 using the transmission procedure of FIG. 14 and the reception procedure of FIG. 15, under the condition that the first secondary logical communication channel 2.6 has been established between the control section SDb-2 (control section 14) of the electronic device B 5 and the control sections SDa-2 (control section 11) and SDa-3 (control section 12) of the electronic device A 4 upon issuance of the establishment request 71 by the control section SDb-2 (control section 14), i.e., under the condition that a message can be transferred as SLTF 82 and 85, the control section SDc-1 (control section 15) of the electronic device C 6 issues to the control section SDa-2 (control section 11) of the electronic device A 4 the establishment request 120 for requesting to establish the second secondary logical communication channel 2.7, and transfers SLRQ 121 to the electronic device A 4 to thereby transmit the establishment notice 122 to the control section SDa-2 (control section 11). In this case, since the control section SDa-2 (control section 11) has established the first secondary logical communication channel 2.6 relative to the control section SDb-2 (control section 14) of the electronic device B 5 different from the electronic device C 6, it judges that the establishment request for the secondary logical communication channel from the other control section cannot be allowed. Therefore, the control section SDa-2 (control section 11) sends back the establishment rejection 123 as SLRJ 124 to the electronic device C 6 which requested the establishment, and notifies the control section SDc-1 (control section 15) of the establishment error 125. The control section SDc-1 (control section 15) which rejected to establish the second secondary logical communication channel is thereafter notified by the establishment confirmation 131, in accordance with the predetermined establishment error recovery procedure and after the communication sequence for releasing the first secondary logical communication channel 2.6 is executed upon issuance of a release request from the control section SDb-2 (control section 14) of the electronic device B 5, i.e., the control request 105 for SDa-2 (control section 11) and the control request 108 for SDa-3 (control section 12), of the fact that the establishment request 126 was issued again and the control section SDa-2 (control section 11) has allowed to establish the second secondary logical communication channel. Thereafter, the transfer sequence of a message is carried out as many times as necessary between SDc-1 (control section 15) and SDa-2 (control section 11), and the release sequence for the established second secondary logical communication channel is carried out. In releasing the second secondary logical communication channel 2.6 which interconnects SDb-2 (control section 14) and the two control sections SDa-2 (control section 11) and SDa-3 (control section 12) of the electronic device A 4, a desired one of the two control sections may be disconnected from the second secondary logical communication channel 2.6. Namely, SDb-2 (control section 14) of the electronic device B 5 issues the release request for the second secondary logical communication channel 2.6 only to the SDb-2 (control section 11) of the electronic device A 4 with which SDc-1 (control section 15) of the electronic device C 6 intends to communicate, to thereby make only SDa-2 (control section 11) unoccupied. The unoccupied SDa-2 (control section 11) is made thereafter allowable to receive the establishment request for the secondary logical communication channel in one-to-one correspondence with SDc-1 (control section 15) of the electronic device C 6 whose establishment request was once rejected.

As described above, in the second embodiment there is provided, in a control section, communication means for the communication between a control section and a communication section and means for establishing or releasing the secondary logical communication channel used between the control section of different electronic devices. Therefore, communication can be efficiently carried out between control sections, and in addition exclusive communication control for a message transmission/reception between control sections can be realized using a simple communication sequence.

What is claimed is:

1. An electronic communication device for connection to a transmission line in a communication system, said communication system comprising at least two said electronic communication devices connected to said transmission line, said electronic communication device comprising:

a plurality of first sub-devices each including a first control section;

a first communication section for (a) assembling a message including at least one of a first part containing data relating to establishment of a primary logical communication channel on said transmission line, a second part containing data relating to release of a primary logical communication channel on said transmission line and a third part containing data relating to message content of said message and (b) receiving a said message from another one of said at least two communication devices, said primary channel for transferring said message between said first communication section and a second communication section of said another one of said at least two communication devices connected to said transmission line;

said first control section for processing said message transferred via said primary channel and for sending to said first communication section a first connection request addressed to a particular second control section of a second sub-device of said another one of said communication devices and including first information relating to establishment of, and second information relating to release of, on said primary channel, a secondary logical communication channel between (a) one or more of said first sub-devices of said first communication device and (b) said particular second control section of said second sub-device of said another one of said communication devices; and said first communication section, in response to said first connection request, transmitting to said second communication section of said another one of said communication devices a second connection request, including address information identifying said particular second control section of said another one of said communication devices, for establishing said secondary communication channel;

whereby said second communication section, in response to said second connection request, sends to said particular second control section of said another one of said communication devices, on the basis of said address information contained in the second connection request from the first communication device, a third connection request for establishing said secondary channel, such that said secondary channel may be established; and said first communication section transferring at least a part of said message to any said first control section of any one of said first sub-devices.

2. The electronic communication device of claim 1, wherein said first information sent by said first control section to said first communication section relating to establishment of said secondary channel comprises data simultaneously specifying connection of a plurality of said first sub-devices of said communication device to said secondary channel.

3. The electronic communication device of claim 1, wherein said first communication section stores discrimination information concerning said first control section of said first subdevices of said first communication device and said second control section of said another one of said communication devices, said discrimination information containing an indication whether any one of said first control section and said second control section is already participating in communication via an already established secondary channel, and said first communication section decides whether to accept or reject said first connection request based upon said discrimination information.

4. The electronic communication device of claim 1, wherein said first communication section stores discrimination information concerning said another one of said communication devices, said second communication section and said second control section, and said first control section of said of said first sub-devices of said first communication device stores discrimination information concerning said second control section of said another one of said communication devices, and said first communication section decides whether to accept or reject said first connection request based upon said discrimination information.

5. A communication system comprising:

at least a first electronic communication device and a second electronic communication device each for connection to a common transmission line;

said first electronic communication device comprising a plurality of first sub-devices, each including a first control section, and a first communication section;

said second electronic communication device comprising a plurality of second sub-devices, each including a second control section, and a second communication section;

said first communication section for (a) assembling a message including at least one of a first part containing data relating to establishment of a primary logical communication channel on said transmission line, a second part containing data relating to release of a primary logical communication channel on said transmission line and a third part containing data relating to message content of said message and (b) receiving a said message from said second electronic communication device, said primary channel for transferring said message between said first communication section and said second communication section of said second electronic communication device connected to said transmission line;

said first control section for processing said message transferred via said primary channel and for sending to said first communication section a first connection request addressed to a particular said second control section of a said second sub-device of said second communication device and including first information relating to establishment of, and second information relating to release of, on said primary channel, a secondary logical communication channel between (a) one or more of said sub-devices of said first communication device and (b) said particular second control section of said second communication device;

said first communication section, in response to said first connection request, transmitting to said second communication section of the second communication device a second connection request, including address information identifying said particular second control section of said second communication device, for establishing said secondary communication channel;

said second communication section, in response to said second connection request, sending to said particular second control section of the second communication device, on the basis of said address information contained in the second connection request form the first electronic communication device, a third connection request for establishing said secondary channel, whereby said secondary channel is established; and said first communication section transferring at least a part of said message to any said first control section of any one of said first sub-devices.

6. The electronic communication device of claim 5, wherein said first information sent by said first control section to said first communication section relating to establishment of said secondary channel comprises data simultaneously specifying connection of a plurality of said first sub-devices of said first communication device to said secondary channel.

7. The electronic communication device of claim 5, wherein said first communication section stores discrimination information concerning said first control section of said first sub-devices of said first communication device and said second control section of said second communication device, said discrimination information containing an indication whether any one of said first control section of said first sub-devices and said second control section is already participating in communication via an already established secondary channel, and said first communication section decides whether to accept or reject said first connection request based upon said discrimination information.

8. The electronic communication device of claim 5, wherein said first communication section stores discrimination information concerning said second communication device, said second communication section and said secod control section, and said first control section of each of said first subdevices of said first communication device stores discrimination information concerning said second control section of said second communication device, and said first communication section decides whether to accept or reject said first connection request based upon said discrimination information.

9. An electronic communication device adapted to be connected to a transmission line in a communication system comprising at least two said electronic communication devices connected to said transmission line, said electronic communication device comprising:

a plurality of first sub-devices each including a first control section;

a first communication section for assembling a message including at least one of a first part containing data relating to establishment of a first logical communication channel on said transmission line, a second part containing data relating to release of said first logical communication channel on said transmission line, and a third part containing data relating to message content of sid message, said communication channel for mutually exchanging said message between at least one said first control section of at least one of said first sub-devices and a second control section of another one of said at least two communication devices;

said first control section for processing said message transferred via said communication channel;

said first communication section for transferring said message received from said transmission line to any said first control section of any one of said first sub-devices; and said first control section, when it is not among said at least one first control section of at least one of said first sub-devices engaged in mutual exchange of said message, sending to said first communication section first information relating to establishment of, and second information relating to release of, a second communication channel on said transmission line.

10. The electronic communication device of claim 9, wherein said first control section sends back, to a second control section of a second electronic communication device from which said first control section has received a request for establishing said logical communication channel, a response rejecting said request when another logical communication channel to said first control section is already established.

11. The electronic communication device of claim 9, wherein said first information sent by said first control section to said first communication section relating to establishment of said logical channel comprises data simultaneously specifying connection of a plurality of sid first sub-devices of said communication device to said logical channel.

12. The electronic communication device of claim 9, wherein said first communication section sends back, to a second control section of a second electronic communication device from which said first control section has received a request for establishing said logical communication channel, a response rejecting said request when another logical communication channel to said first control section is already established.

13. The electronic communication device of claim 9, wherein said first communication section stores information indicating whether a logical communication channel to said first control section of said first electronic communication device is already established to enable a judgment to be made as to whether or not a response rejecting a request for establishing said logical communication channel is to be sent back to a second control section of another communication device from which a said request has been issued.

14. A communication system comprising:

at least a first electronic communication device and a second electronic communication device each for connection to a common transmission line;

said first electronic communication device comprising a plurality of first sub-devices, each including a first control section, and a first communication section;

said second electronic communication device comprising a plurality of second sub-devices, each including a second control section, and a second communication section;

said first communication section for assembling a message including at least one of a first part containing data relating to establishment of a first logical communication channel on said transmission line, a second part containing data relating to release of said first logical communication channel on said transmission line, and a third part containing data relating to message content of said message, said communication channel for mutually exchanging said message between at least one said first control section of at least one of said first sub-devices and said second control section;

said first control section for processing said message transferred via said communication channel and for transferring at least a portion of said message to said first communication section;

said first communication section for transferring said message received from said transmission line to any said first control section of any one of said first sub-devices;

said first control section, when it is not among said at least one first control section of at least one of said first sub-devices engaged in mutual exchange of said message, sending to said first communication section first information relating to establishment of, and second information relating to release of, a second communication channel on said transmission line.

15. The electronic communication device of claim 14, wherein said first control section sends back, to a second control section of a second electronic communication device from which said first control section has received a request for establishing said logical communication channel, a response rejecting said request when another logical communication channel to said first control section is already established.

16. The electronic communication device of claim 14, wherein said first information sent by said first control section to said first communication section relating to establishment of said logical channel comprises data simultaneously specifying connection of a plurality of sid first sub-devices of said communication device to said logical channel.

17. The electronic communication device of claim 14, wherein said first communication section sends back, to a second control section of a second electronic communication device from which said first control section has received a request for establishing said logical communication channel, a response rejecting said request when another logical communication channel to said first control section is already established.

18. The electronic communication device of claim 14, wherein said first communication section stores information indicating whether a logical communication channel to said first control section of said first electronic communication device is already established to enable a judgment to be made as to whether or not a response rejecting a request for establishing said logical communication channel is to be sent back to a second control section of another communication device from which a said request has been issued.

* * * * *